(12) United States Patent
Agrawal et al.

(10) Patent No.: US 12,272,009 B2
(45) Date of Patent: Apr. 8, 2025

(54) ELECTRONIC SYSTEM AND METHOD TO PROVIDE SPHERICAL BACKGROUND EFFECTS FOR VIDEO GENERATION FOR VIDEO CALL

(71) Applicant: MOTOROLA MOBILITY LLC, Wilmington, DE (US)

(72) Inventors: Amit Kumar Agrawal, Bangalore (IN); Jeffrey S. Vanhoof, Gurnee, IL (US); Bill Ryan, Libertyville, IL (US); Daniel M Vacura, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 187 days.

(21) Appl. No.: 17/935,379

(22) Filed: Sep. 26, 2022

(65) Prior Publication Data
US 2024/0104857 A1 Mar. 28, 2024

(51) Int. Cl.
| G06T 19/00 | (2011.01) |
| G06T 7/194 | (2017.01) |
| G06T 19/20 | (2011.01) |
| H04N 5/272 | (2006.01) |
| H04N 23/695 | (2023.01) |

(52) U.S. Cl.
CPC ............ *G06T 19/006* (2013.01); *G06T 7/194* (2017.01); *G06T 19/20* (2013.01); *H04N 5/272* (2013.01); *H04N 23/695* (2023.01); *G06T 2219/024* (2013.01); *G06T 2219/2004* (2013.01)

(58) Field of Classification Search
None
See application file for complete search history.

(56) References Cited

U.S. PATENT DOCUMENTS

| 2014/0225978 A1* | 8/2014 | Saban ................... G06T 7/0012 348/14.07 |
| 2019/0355172 A1* | 11/2019 | Dsouza ................... G06F 3/017 |
| 2022/0309733 A1* | 9/2022 | Kagarlitsky .............. G06T 7/60 |
| 2024/0096024 A1* | 3/2024 | Takama ................ G06F 21/604 |

\* cited by examiner

*Primary Examiner* — James A Thompson
(74) *Attorney, Agent, or Firm* — Isidore PLLC

(57) ABSTRACT

An electronic system, a method, and a computer program product generate a video recording or stream with a spherical background image that maintains orientation like a natural background for a video call as an image capturing device changes location or aim direction. The method includes connecting, by a communication subsystem of an electronic system, over a network to a video communication session with second electronic device(s). The method includes determining a stationary orientation of a spherical background image in a virtual space geospatially aligned with a first physical location of the electronic system. The method includes extracting a foreground image from an image stream from image capturing device(s). The method includes generating a composite image stream of the foreground image superimposed on the spherical background image. The method includes communicating the composite image stream to second electronic system(s) that participate in a video communication session.

20 Claims, 20 Drawing Sheets

Determine a first spatial orientation and a first physical location of an image capturing device of an electronic system
934

↓

Determine a stationary orientation of a spherical background image in a virtual space geospatially aligned with the first physical location
936

↓

Extract a foreground image of an image stream from a field of view captured by the image capturing device
938

↓

Generate a composite image stream of the foreground image superimposed on the spherical background image
940

↓

Identify, by the gesture-controlled background repositioning feature, an object within the foreground image that moves within the physically constrained space to produce a gesture control input comprising one or more of: a looking gaze direction; (ii) a mouth movement; (iii) a hand point gesture; and (iv) a head tilting movement
942

↓

Activate the gesture-controlled background repositioning feature to automatically rotate the spherical background image based on receipt of the gesture control input
944

↓

Store the composite image stream in memory for later access and/or communication
946

↓

END

*FIG. 9C*

ELECTRONIC SYSTEM AND METHOD TO PROVIDE SPHERICAL BACKGROUND EFFECTS FOR VIDEO GENERATION FOR VIDEO CALL

CROSS REFERENCE TO RELATED APPLICATIONS

The present application is related to three commonly owned U.S. patent applications filed on even date herewith to the same named inventors and entitled respectively: (i) Electronic System and Method to Provide Spherical Background Effects for Video Generation U.S. application Ser. No. 17/935,333; (ii) Electronic Device and Method to Provide Spherical Background Effects for Video Generation for a Spatially Constrained User U.S. application Ser. No. 17/935,358; and (iii) Electronic System and Method Providing a Shared Virtual Environment for a Video Call Using Video Stitching With a Rotatable Spherical Background U.S. application Ser. No. 17/935,397, the disclosures of all of which are hereby incorporated by reference in their entirety.

BACKGROUND

1. Technical Field

The present disclosure relates generally to generating a video stream from an image capturing device, and more particularly to generating the video image with substituted background imagery behind an extracted foreground image.

2. Description of the Related Art

Electronic devices such as mobile phones, network servers, desktop workstations, laptops, and tablets are often used to create a video podcasts. In particular, certain smartphones have cameras that are capable of generating videos of good quality and in mobile settings, expanding opportunities for videos made with interesting backgrounds. However, often the ambient conditions such as lighting and noise levels do not lend themselves for using a natural background. In another example, the available background may not be attractive. In an additional example, the available background may not be relevant to a topic of the video podcast.

Video generating software may include features to substitute the natural background with a background image or video. An extracted foreground image, such as an image of a person, is superimposed on the background image or video. While a foreground image or subject of the video remains relatively stationary, the background image or video may present an appealing or informative context for the composite video. The artificial nature of the background becomes readily apparent when a vantage point of the video changes with respect to the foreground image superimposed on the fixed background image.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 9A-9C (collectively "FIG. 9") present a flow diagram of a method of generating a video recording or stream with spherical background effects for video generation for a spatially constrained user with automatic gesture-control background positioning, according to one or more embodiments;

DETAILED DESCRIPTION

Figure 1:
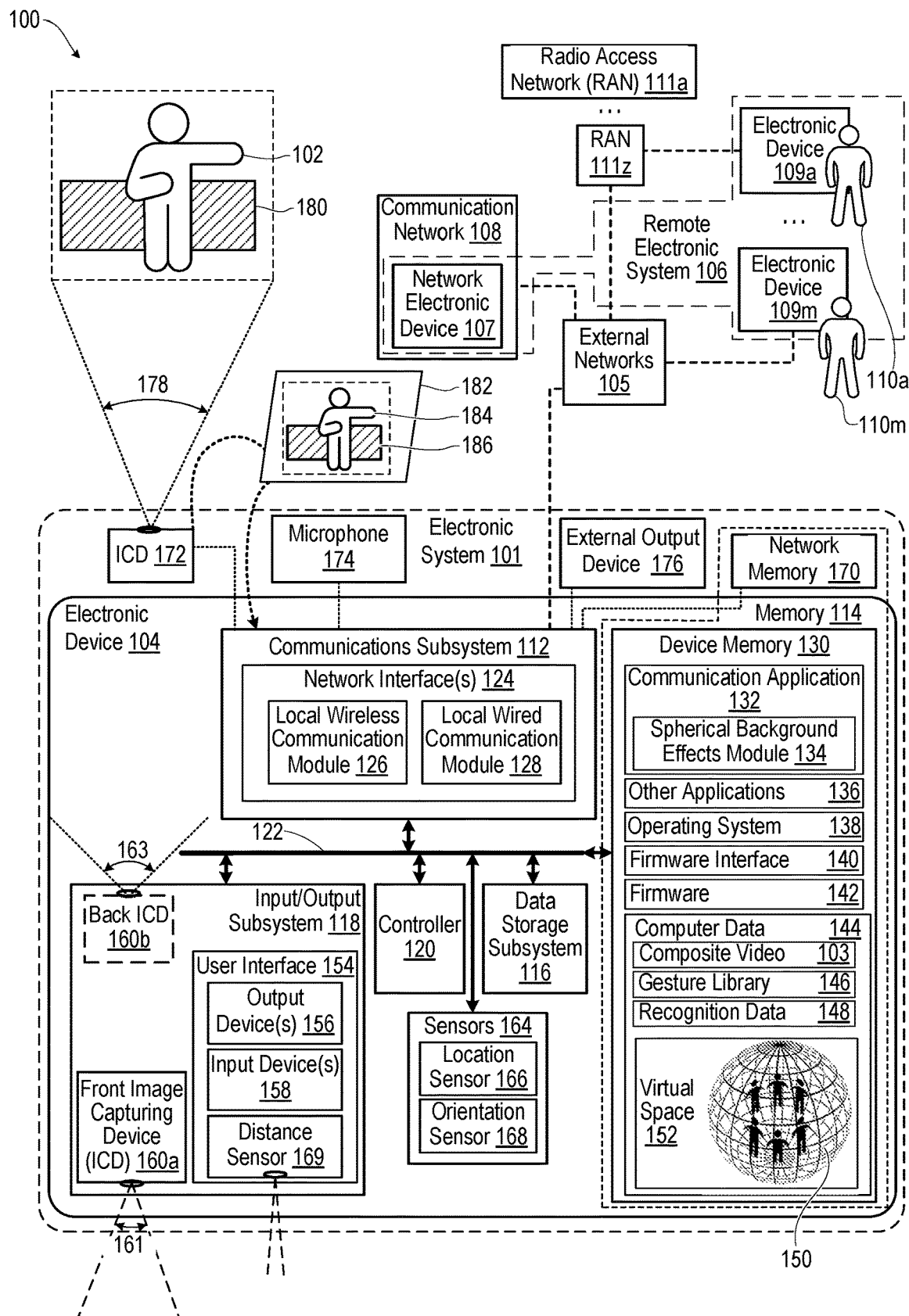
FIG. 1 depicts a functional block diagram of an electronic system used by a person to generate a video having spherical background effects, according to one or more embodiments.

According to one or more aspects of the present disclosure, an electronic system, a method, and a computer program product generate an image stream with spherical background effects for a video call. The electronic system includes a communications subsystem that enables the electronic system to connect over a network to a video communication session with one or more second electronic device. The electronic system includes at least one or more output devices and at least one image capturing device that has a field of view that includes a foreground and a background. A controller of the electronic system is communicatively connected to the communications subsystem and the at least one image capturing device. The controller determines a stationary orientation of a first spherical background image and a first physical location of the electronic system. The controller determines a stationary orientation of a spherical background image in a virtual space geospatially aligned with the first physical location. The controller extracts a foreground image extracted from an image stream of the field of view from the image capturing device. The controller generates a composite image stream of the foreground image superimposed on the spherical background image. The controller communicates the composite image stream to one or more second electronic systems that participate in a video communication session.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of communication environment 100 including electronic system 101 used by first person 102 to generate composite video 103 that includes a video recording or a video stream having spherical background effects. Electronic system 101 includes, or may be wholly embodied as, first electronic device 104. First electronic device 104 can be one of a host of different types of devices, including but not limited to, an infant monitoring system, a mobile cellular phone, satellite phone, or smart phone, a laptop, a netbook, an ultra-book, a networked smart watch, networked sports/exercise watch, and/or a tablet computing device or similar device. As more completely presented as communication device 204 of FIG. 2, which is described hereafter, electronic device 104 can also be a device supporting wireless communication. In these implementations, electronic device 104 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Most importantly, it is appreciated that the features described herein can be implemented with a display device of various other types of electronic devices that are not necessarily a communication device. The specific presentation or description herein of a mobile communication device in addition to a data processing system as different examples of electronic device 104 are for example only, and not intended to be limiting on the disclosure.

Figure 2:
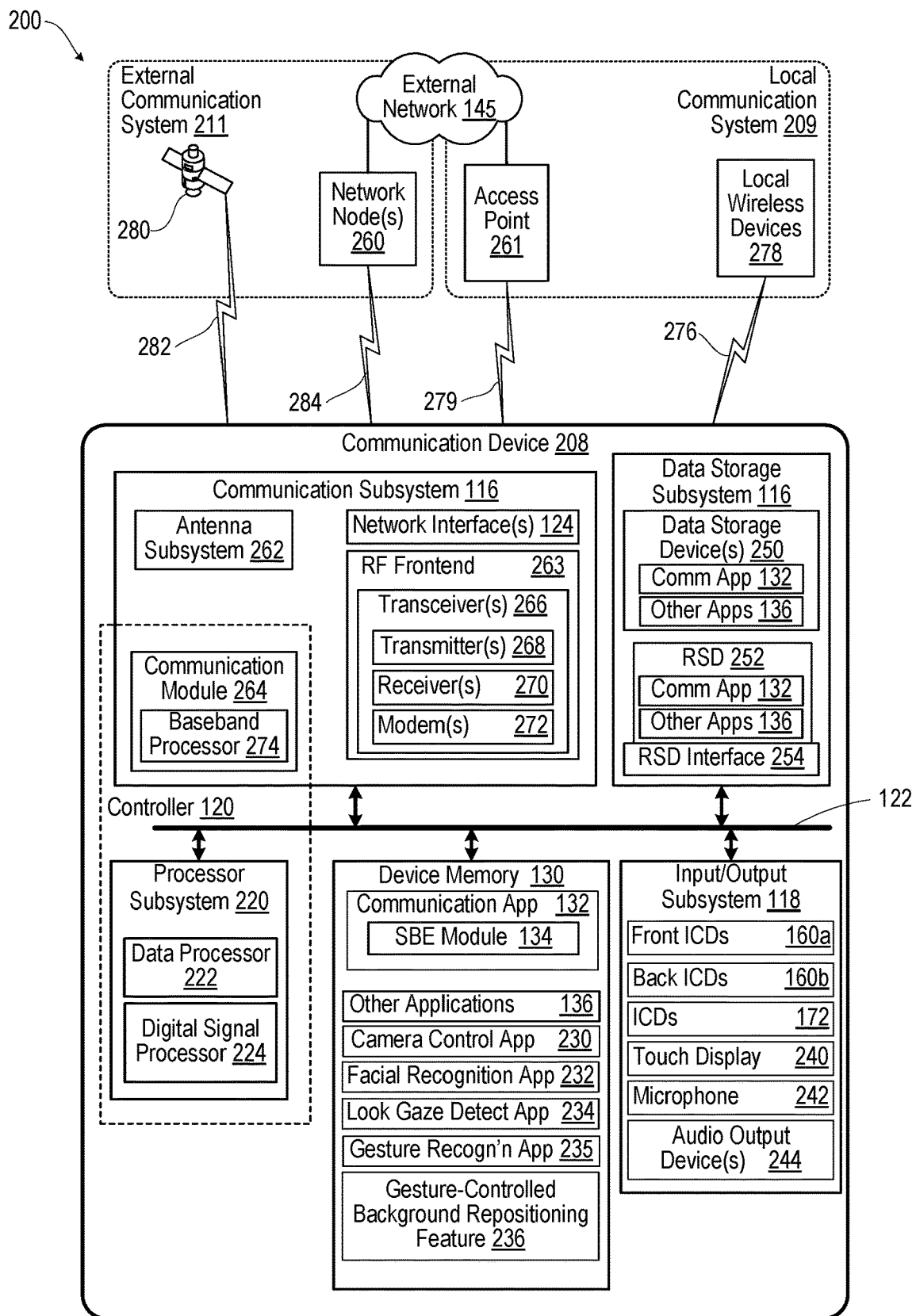
FIG. 2 depicts an example electronic device that is configured as a communication device to communicate with communication networks and other wireless devices and communicate a video having spherical background effects, according to one or more embodiments.

In one aspect, electronic system 101 may operate stand-alone without necessarily communicating with remote electronic system 106 when generating video. In another aspect, communication environment 100 provides an operating environment within which the features of the present disclosure are advantageously implemented. Electronic system 101 may communicate composite video 103 that incorporates spherical background effects with remote electronic system 106 via external network 105. Remote electronic system 106 may include one or more network electronic devices 107 (e.g., network servers) supported by communications network 108 that provide network communication hosting services. Remote electronic system 106 may include second electronic devices 109a-109m used by corresponding second persons 110a-110m. One or more of first electronic system 101 and second electronic devices 109a-109m may communicatively connect to external networks 105 via radio access networks 111a-111z. In one or more embodiments, a communication session may be assisted by network electronic device(s) 107 of communication network 108. Each second electronic device 109a-109m may include the same or similar components described for first electronic device 104 or communication device 204 (FIG. 2). Each electronic device 104 and 109a-109m may originate audio and/or video that is provided to the communication session. Each electronic device 104 and 109a-109m may receive audio and/or video from the communication session that originates at one or more other electronic devices 104 and 109a-109m.

Referring now to the specific component makeup and the associated functionality of the presented components, electronic device 104 of first electronic system 101 includes communications subsystem 112, memory subsystem 114, data storage subsystem 116, and input/output subsystem 118 managed by controller 120. System interlink 122 communicatively connects controller 120 with communications subsystem 112, memory subsystem 114, data storage subsystem 116, and input/output subsystem 118. Communications subsystem 112 may include one or more network interfaces 124 such as low power local wireless communication module 126 and local wired communication module 128 to communicatively couple to external networks 105.

Memory subsystem 114 may include device memory 130. Device memory 130 includes program code for applications, such as communication application 132 that includes spherical background effects (SBE) module 134 and other applications 136. In one or more embodiments, SBE module 134 is a suite of applications, utilities, components, or modules that configure first electronic device 104 to generate video with spherical background effects. Device memory 142 further includes operating system (OS) 138, firmware interface 140, such as basic input/output system (BIOS) or Uniform Extensible Firmware Interface (UEFI), and firmware 142. Device memory 130 stores computer data 144 that is used by SBE module 134, such as gesture library 146 that supports recognizing gesture-commanded spherical background effects. Examples of gestures characterized by gesture library 146 may include a hand pointing, a head turn one or more times toward one lateral side, a head nod one or more times, a torso that leans toward one side, a hand wave to one side, etc. Computer data 144 may include user recognition data 148 that may be used to identify a particular person or characteristics of a person. Recognition data 148 may include facial recognition, voice recognition, or other unique biometric data. Recognition data 148 may include association with personal identifies such as passcodes provided by a person. Recognition data 148 may include machine-readable identification data such as a radio frequency identification (RFID) badge worn by person 102. Recognition data 148 may include object recognition images, such as to identify that a person is seated and is thus stationary and will continue to be stationary while seated. Computer data 144 includes spherical background image(s) 150 manipulated within virtual space 152. Device memory 130 stores computer data 144 that is generated by SBE module 134, such composite video 103.

In one or more embodiments, input/output subsystem 118 provides user interface devices 154 including one or more output devices 156 and one or more input devices 158. User interface devices 154 may enable user interaction with first electronic device 104 using inputs and outputs that are one or more of visual, haptic, touch, sound, gesture, etc. In one embodiment, the input/output subsystem 118 include front image capturing device (ICD) 160a that has forward field of view (FOV) 161. Input/output subsystem 118 may include back ICD 160b that has back FOV 163.

In one or more embodiments, electronic device 104 includes sensors 164 that are responsive to positioning and movement of electronic device 104, such as location sensor 166 and orientation sensor 168. In one or more embodiments, electronic device 104 includes sensors 164 that are responsive to positioning and movement of electronic device 104, such as location sensor 166 and orientation sensor 168. Sensors 164 may also include distance sensor 169 such as a radar or lidar sensor. In one or more embodiments, first electronic system 101 augments components and features of electronic device 104 by additional devices. In an example, memory subsystem 114 may augment device memory 130 with external memory such as network memory 170. Input/output subsystem 118 may be augmented by ICD 172, microphone 174, and external output devices 176 that are detached from electronic device 104 and that interact with first person 102.

According to aspects of the present disclosure, an ICD such as ICD 172 has FOV 178 oriented toward first person 102 who is aligned with background objects 180. ICD 172 captures image stream 182 that includes foreground image 184 of first person 102 surrounded by background image 186 of background objects 180. At least one sensor 164 of electronic system 101 detects an orientation and location of ICD 172. Controller 120 determines a first spatial orientation and a first physical location of ICD 172 of electronic system 101. Controller 120 determines a stationary orientation of spherical background image 150 in virtual space 152 geospatially aligned with the first physical location. Controller 120 extracts foreground image 184 from image stream 182 of FOV 178 captured by ICD 172. Controller 120 generates a composite image stream such as composite video 103 of foreground image 184 superimposed on spherical background image 150. In response to movement, detected by at least one sensor 164, of at least a portion of electronic system 101 including ICD 172 to one or more of a second spatial orientation and a second physical location, controller 120 updates a corresponding one or more of a virtual orientation and a virtual location of spherical background image 150 relative to foreground image 184 to remain geospatially aligned with the first physical location.

FIG. 2 is a functional block diagram of communication environment 200 in which communication device 204, operating as a host device for video generation, such as for a video podcast or a communication session, communicates with external communication system 211. Communication device 204 is an implementation of first electronic device 104 (FIG. 1). Communication device 204 includes communications subsystem 112, memory subsystem 114, data storage subsystem 116, input/output subsystem 118, and controller 120, as previously described but having additional functionality.

Controller 120 includes processor subsystem 220, which executes program code to provide operating functionality of communication device 204. Controller 120 manages, and in some instances directly controls, the various functions and/or operations of communication device 204. These functions and/or operations include, but are not limited to including, application data processing, communication with second communication devices, navigation tasks, image processing, and signal processing. In one or more alternate embodiments, communication device 204 may use hardware component equivalents for application data processing and signal processing. For example, communication device 204 may use special purpose hardware, dedicated processors, general purpose computers, microprocessor-based computers, micro-controllers, optical computers, analog computers, dedicated processors and/or dedicated hard-wired logic.

The software and/or firmware modules executed by processor subsystem 220 have varying functionality when their corresponding program code is executed by data processor(s) 222 or secondary processing devices within communication device 204 such as digital signal processor 224. Processor subsystem 220 can include other processors that are communicatively coupled internally or externally to data processor 222. Data processor 222 is communicatively coupled, via system interlink 122, to data storage subsystem 116 and device memory 130. System interlink 122 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 122) are illustrated in FIG. 1, it is to be understood that more, fewer, or different interconnections may be present in other embodiments.

Processor subsystem 220 of controller 120 can execute program code of SBE module 134 to configure communication device 208 to perform specific functions for generating video having spherical background effects. In an example, SBE module 134 can include or utilize camera control application 230, facial recognition application 232, look gaze detect application 234, gesture recognition application 235, and gesture-controlled background repositioning (GCBR) feature 236. Processor subsystem 220 receives data from certain components of input/output subsystem 118 and presents data on certain components of input/output subsystem 118. In an example, input/output subsystem 118 includes back ICDs 160a, 160b and 172, touch display 240, microphone 242, and audio output device(s) 244.

Data storage subsystem 116 of communication device 204 includes data storage device(s) 250. Controller 120 is communicatively connected, via system interlink 122, to data storage device(s) 250. Data storage subsystem 116 provides applications, program code, and stored data on nonvolatile storage that is accessible by controller 120. For example, data storage subsystem 116 can provide a selection of applications and computer data, such as communication application 132 that includes SBE module 134 and other application(s) 136. These applications can be loaded into device memory 130 for execution by controller 120. In one or more embodiments, data storage device(s) 250 can include hard disk drives (HDDs), optical disk drives, and/or solid-state drives (SSDs), etc. Data storage subsystem 116 of communication device 204 can include removable storage device(s) (RSD(s)) 252, which is received in RSD interface 254. Controller 120 is communicatively connected to RSD 252, via system interlink 122 and RSD interface 254. In one or more embodiments, RSD 252 is a non-transitory computer program product or computer readable storage device. Controller 120 can access data storage device(s) 250 or RSD 252 to provision communication device 204 with program code, such as code for communication application 132 and other application(s) 136, and with computer data 144 such as spherical background image 150 (FIG. 1).

Communication device 204 further includes communications subsystem 112 for communicating, using a cellular connection, with network node(s) 260 of external communication system 211 and for communicating, using a wireless connection, with wireless access point 261 of local communication system 209. Communications subsystem 116 includes antenna subsystem 262. Communications subsystem 116 includes radio frequency (RF) front end 263 and communication module 264. RF front end 263 includes transceiver(s) 266, which includes transmitter(s) 268 and receiver(s) 270. RF front end 263 further includes modem(s) 272. Communication module 264 of communications subsystem 116 includes baseband processor 274 that communicates with controller 120 and RF front end 263. Baseband processor 274 operates in a baseband frequency range to encode data for transmission and decode received data, according to a communication protocol. Modem(s) 272 modulate baseband encoded data from communication module 264 onto a carrier signal to provide a transmit signal that is amplified by transmitter(s) 268. Modem(s) 272 demodulates each signal received from external communication system 211 using by antenna subsystem 262. The received signal is amplified and filtered by receiver(s) 270, which demodulate received encoded data from a received carrier signal.

In one or more embodiments, controller 120, via communications subsystem 116, performs multiple types of cellular OTA or wireless communication with local communication system 209. Communications subsystem 116 can communicate via an over-the-air (OTA) connection 276 with local wireless devices 278. In an example, OTA connection 276 is a peer-to-peer connection, Bluetooth connection, or other personal access network (PAN) connection. In one or more embodiments, communications subsystem 116 communicates with one or more locally networked devices via a wireless local area network (WLAN) link 279 supported by access point 261. In one or more embodiments, access point 261 supports communication using one or more IEEE 802.11 WLAN protocols. Access point 261 is connected to external networks 145 via a cellular connection. In one or more embodiments, communications subsystem 116 communicates with GPS satellites 280 via downlink channel 282 to obtain geospatial location information. Communications subsystem 116 can communicate via an over-the-air (OTA) cellular connection 284 with network node(s) 260.

Figure 3:
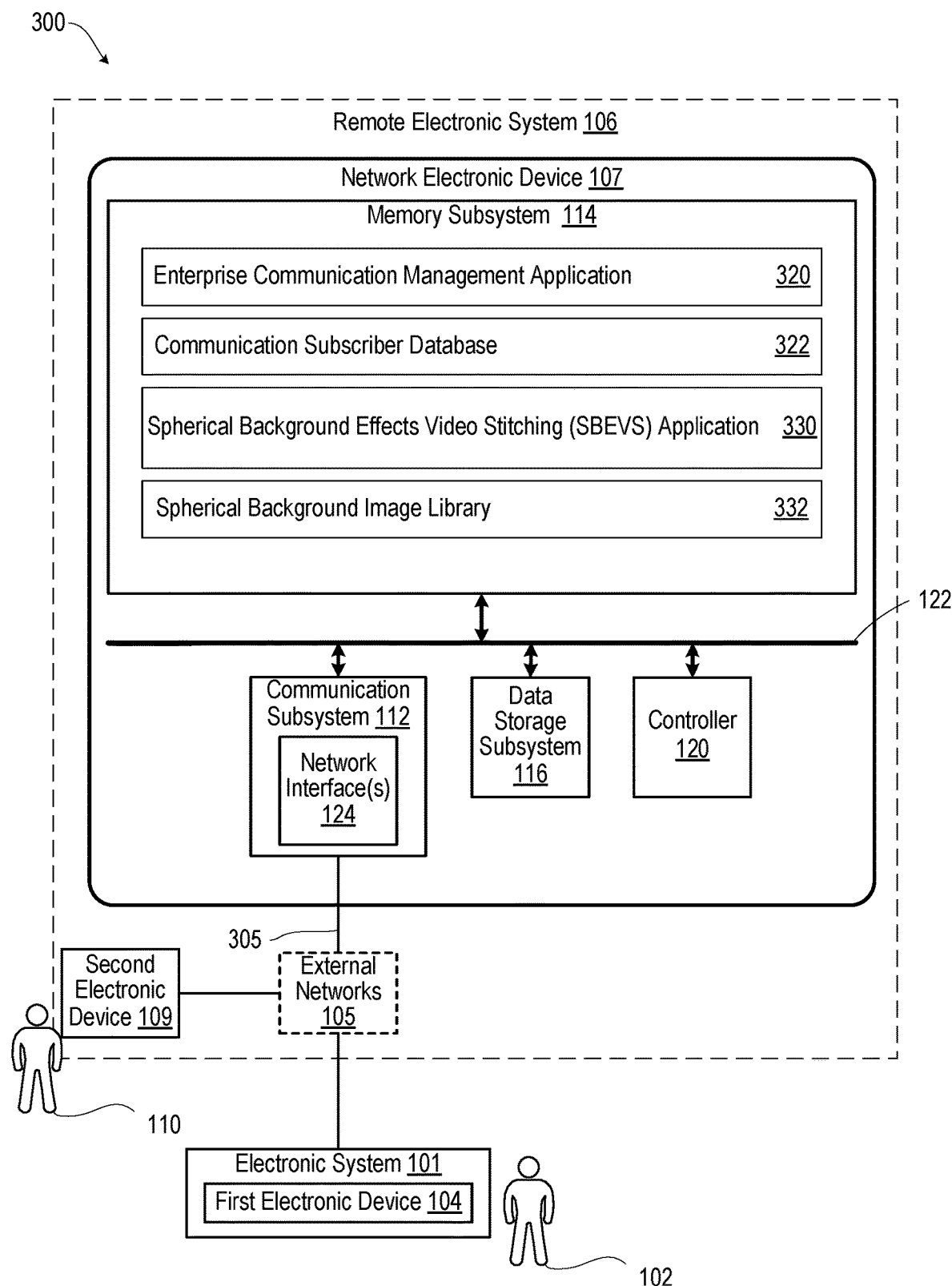
FIG. 3 depicts an example network electronic device that is configured to facilitate communication between electronic devices and to provide video with spherical background effects, according to one or more embodiments.

FIG. 3 depicts communication environment 300 of remote electronic system 106 that includes network electronic device 107 such as a network server that is configured to facilitate communication between first electronic device 104 used by first person 102 and second electronic device 109 used by second person 110 and to perform spherical background effects. Network electronic device 107 includes communications subsystem 112, memory subsystem 114 and data storage subsystem 116, each coupled to controller 120 via system interlink 122. Controller 120 manages each of the subsystems 112, 114, 116. Communications subsystem 112 includes one or more network interfaces 124 connected to external networks 105 via wired and/or wired connections such as fiber 305. Network electronic device 107 may have identical or similar components and functionality as described above for electronic device 104 of FIG. 1 and communication device 204 of FIG. 2. Controller 120 executes applications stored in memory subsystem 114 to support communication. In an example, enterprise communication management application 320 can host an audio and/or video communication session as well as communicate data associated with the session between user devices. Enterprise communication management application 320 creates and manages communication subscriber database 322 that is also stored in memory subsystem 138. Controller 120 also executes applications stored in memory subsystem 114 to support aspects of the present disclosure. Spherical background effects video stitching (SBEVS) application 330 may create spherical background effects for one person or multiple persons in a composite video. Memory subsystem 114 may store or access spherical background image library 332 containing more than one spherical background images 150 (FIG. 1) for providing spherical background effects.

Figure 4:
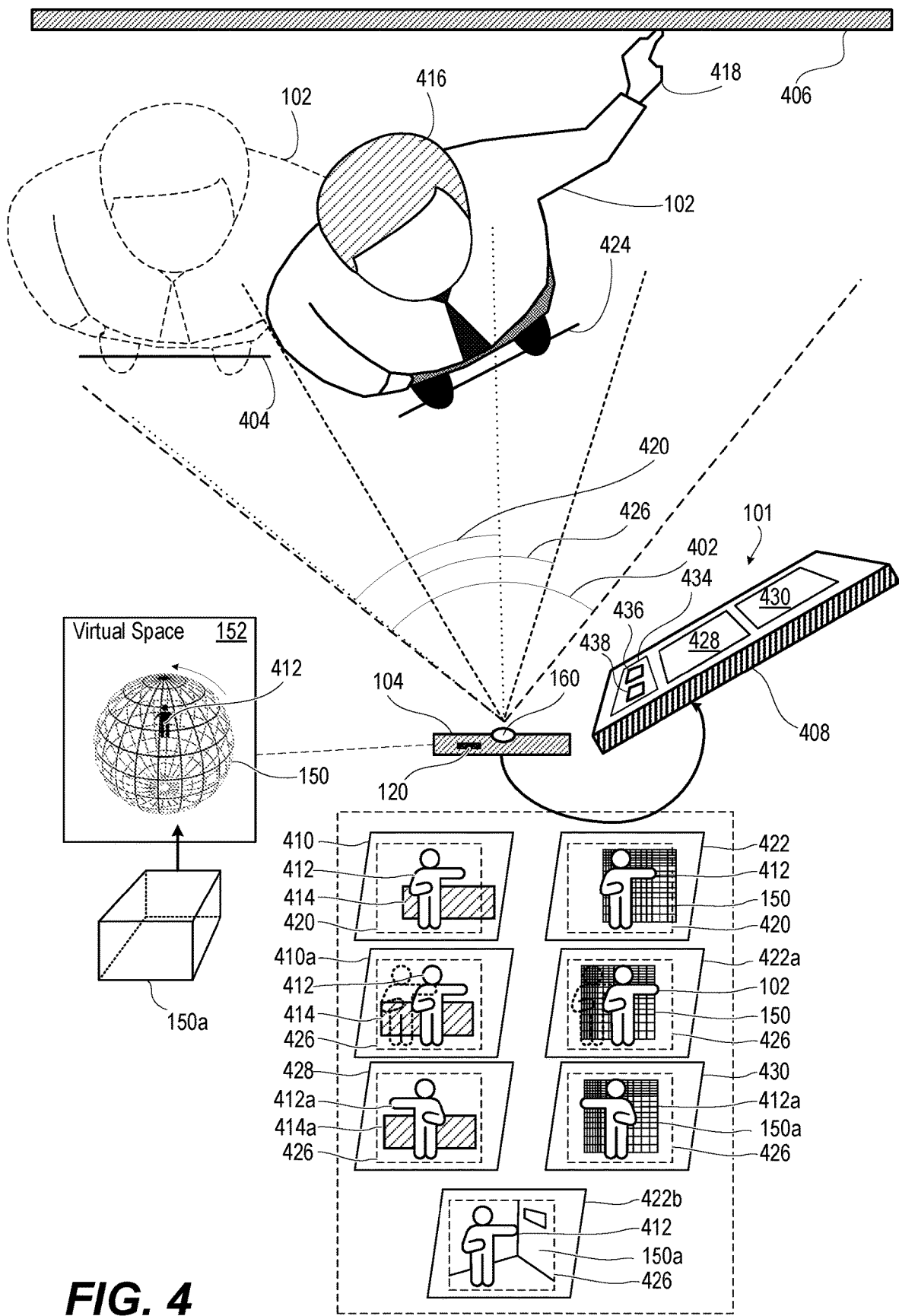
FIG. 4 depicts an example electronic system that detects movement of a foreground image and automatically repositions both a field of view of an image capturing device and a spherical background image to maintain an illusion of a natural background, according to one or more embodiments.

FIG. 4 depicts an example electronic system 101 that detects movement of a foreground image, and which automatically repositions both a field of view of an image capturing device and a spherical background image to maintain an illusion of the captured image having a natural background. In an example, electronic system 101 includes electronic device 104 having ICD 160 with full field of view (FOV) 402 that is positioned and adjusted to view person 102 who initially is at leftward position 404 in front of background object(s) 406. Controller 120 of electronic device 104 is communicatively coupled to output device(s) such display 408. ICD 160 of electronic device 104 generates image stream 410 that is raw video. In an example, electronic device 104 identifies foreground image 412 of person 102 at leftward position 404, differentiating natural background image 414 of background object(s) 406. Controller 120 identifies one or more features (e.g., head 416 and left hand 418) of foreground image 412 in image stream 410. In one or more embodiments, controller 120 adjusts full FOV 402 of ICD 160 to maintain and zoom in on the one or more features within the FOV. In an example, in response to person 102 being at leftward position 404, controller 120 electronically and/or mechanically adjusts ICD 160 to have left FOV 420. In one or more embodiments, in adjusting the field of view of ICD 160, controller 120 crops a foreground portion of full FOV 402 of ICD 160. Controller 120 shifts the foreground portion to maintain one or more features (416, 418) of foreground image 412 in image stream 410 to provide left FOV 420 in response to movement of the one or more features (416, 418). In one or more embodiments, in adjusting the field of view of ICD 160, controller 120 shifts a gimballed lens of ICD 160 to maintain one or more features (416, 418) of foreground image 412 in image stream 410 to provide left FOV 420. Electronic device 104 orients background spherical image 150 in virtual space 152 with foreground image 412 that is extracted from image stream 410 to generate composite image stream 422.

In response to person 102 moving to the right to center position 424, controller 120 adjusts ICD 160 to have centered FOV 426 and generates image stream 410a having foreground image 412a centered against a shifted natural background image 414a. To maintain an illusion that spherical background image 150 remains stationary with changes in vantage point of ICD 160, such as due to the adjustment of the field of view, controller 120 updates a corresponding one or more of the virtual orientation and the virtual location of spherical background image 150 to remain geospatially aligned with the first physical location in generating composite image stream 422a. In updating the corresponding one or more of the virtual orientation and the virtual location of the spherical background image to remain geospatially aligned with the first physical location, the controller renders perspectives of the spherical background image to remove keystoning skewed imagery.

Composite image stream 422a may be intended for recording as a video podcast or streamed as a video communication. To assist person 102 to move relative to natural background objects 406, controller 120 creates mirrored natural image stream 428 in which image stream 410a is laterally reversed including mirrored foreground image 412a and mirrored natural background image 414a for presenting on electronic device 104 or display 408. To further assist person 102 to seemingly interact with or position relative to spherical background image 150, controller 120 creates mirrored composite image stream 430 in which image stream 422a is laterally reversed including mirrored foreground image 412a and mirrored spherical background image 150a for presenting on electronic device 104 or display 408. Display 408 may present one or more of mirrored natural image stream 428 and mirrored composite image stream 430.

In one or more embodiments, output device(s) 156 (FIG. 1) include display device(s) such as display 408 of electronic system 101 that are communicatively coupled to controller 120. Controller 120 presents control interface 434 at display 408. Control interface 434 presents selectable option 436 for inclusion of spherical background image 150. Controller 120 generates composite image stream 422a of foreground image 412a superimposed on spherical background image 414a in response to receiving an enabling input via control interface 434. In one or more embodiments, device memory 130 (FIG. 1) of electronic device 104 stores at least two spherical background images 150 including spherical background image 150 and a second spherical background image 150a. Controller 120 generates composite image stream 422b of foreground image 412 superimposed on second spherical background image 150a in response to receiving a selection input to second selectable option 438 presented at control interface 434 and corresponding to second spherical background image via the control interface.

Figure 5:
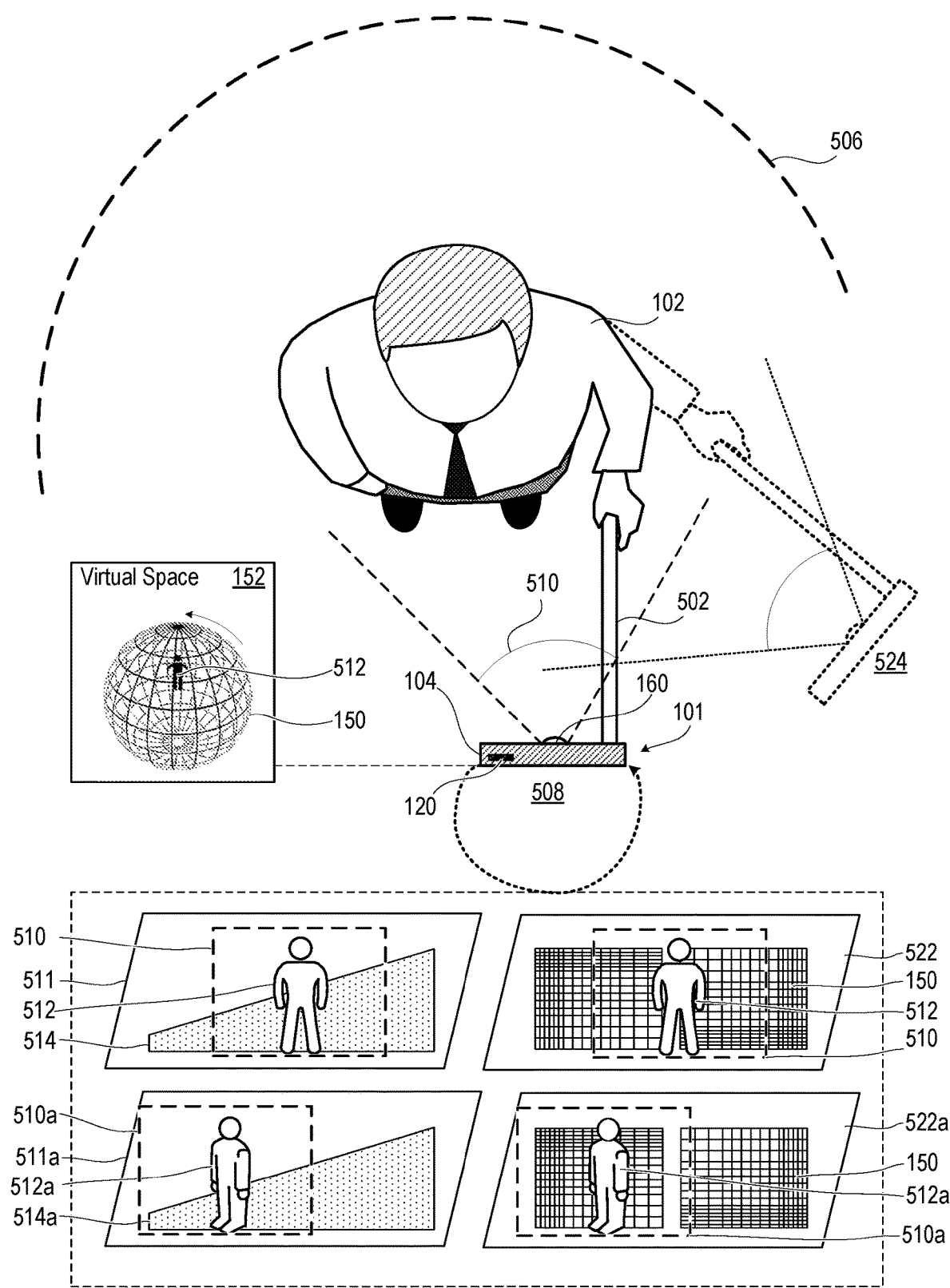
FIG. 5 depicts an example electronic system that detects movement of an image capturing device and automatically repositions a spherical background image to maintain an illusion of a natural background, according to one or more embodiments.

FIG. 5 depicts an example electronic system 101 that detects movement of an image capturing device and automatically repositions a spherical background image to maintain an illusion of a natural background. In an example, electronic system 101 includes electronic device 104 with ICD 160 that is positioned by a camera handle grip 502 such as a selfie stick or handheld stabilizer to aim at person 102 who is positioned in front of natural background object(s) 506. At a first time, electronic device 104 is at first physical location 508 and oriented to have first FOV 510 aligned with a front of person 102 and a center of background object(s) 506 to generate image stream 511 including foreground image 512 and natural background image 514. Controller 120 identifies foreground image 512 of person 102 in front of natural background image 514 of background object(s) 506. Controller 120 determines a first spatial orientation and first physical location 508 of electronic system 101. Controller 120 determines a stationary orientation of spherical background image 150 in virtual space 152 geospatially aligned with first physical location 508. Controller 120 extracts foreground image 512 from image stream 511 of FOV 510 captured by ICD 160. Controller 120 generates a composite image stream 522 of foreground image 512 superimposed on spherical background image 150.

At a subsequent time, electronic system 101 is moved to one or more of a second spatial orientation having FOV 510a and a second physical location 524. FOV 510 is toward a front left side of person 102 and toward a left side of background object(s) 506 to generate image stream 511a including foreground image 512a and natural background image 514a. Controller 120 extracts foreground image 512a from image stream 511a of FOV 510a captured by ICD 160. Controller 120 generates composite image stream 522a of foreground image 512a superimposed on spherical background image 150. In response to movement of at least a portion (e.g., ICD 160) of electronic system 101 to one or more of a second spatial orientation (i.e., FOV 510a) and the second physical location 524, controller 120 updates a corresponding one or more of a virtual orientation and a virtual location of the spherical background image 150 relative to foreground image 512a to remain geospatially aligned with the first physical location 508. Composite image stream 522a maintains an illusion that spherical background image 150 is geospatially stationary.

Figure 12:
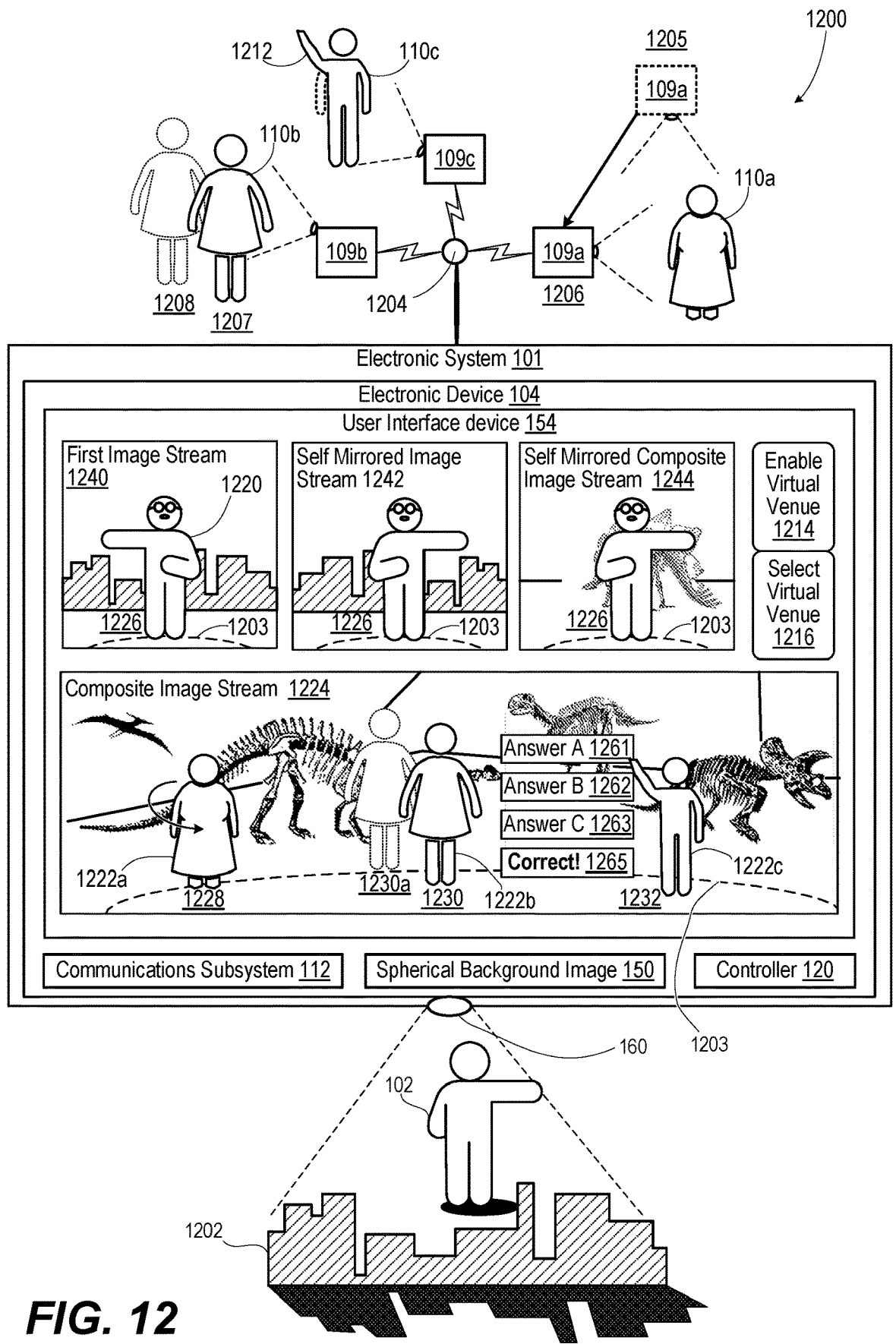
FIG. 12 presents a diagram of a communication environment that supports a video call having a shared multiple person virtual venue with spherical background effects, according to one or more embodiments.

For clarity, FIG. 4 depicts person 102 who moves relative to ICD 160 that is stationary. FIG. 5 depicts person 102 who remains at a stationary location while moving ICD 160. Aspects of the present disclosure support concurrent movement by both person 102 and ICD 160 relative to location and additionally, movement of an aim direction of ICD 160, an example of which is depicted in FIG. 12 and described below. With regard to FIG. 5, person 102 may also change location in addition to positioning ICD 160 relative to person 102.

Figure 6:
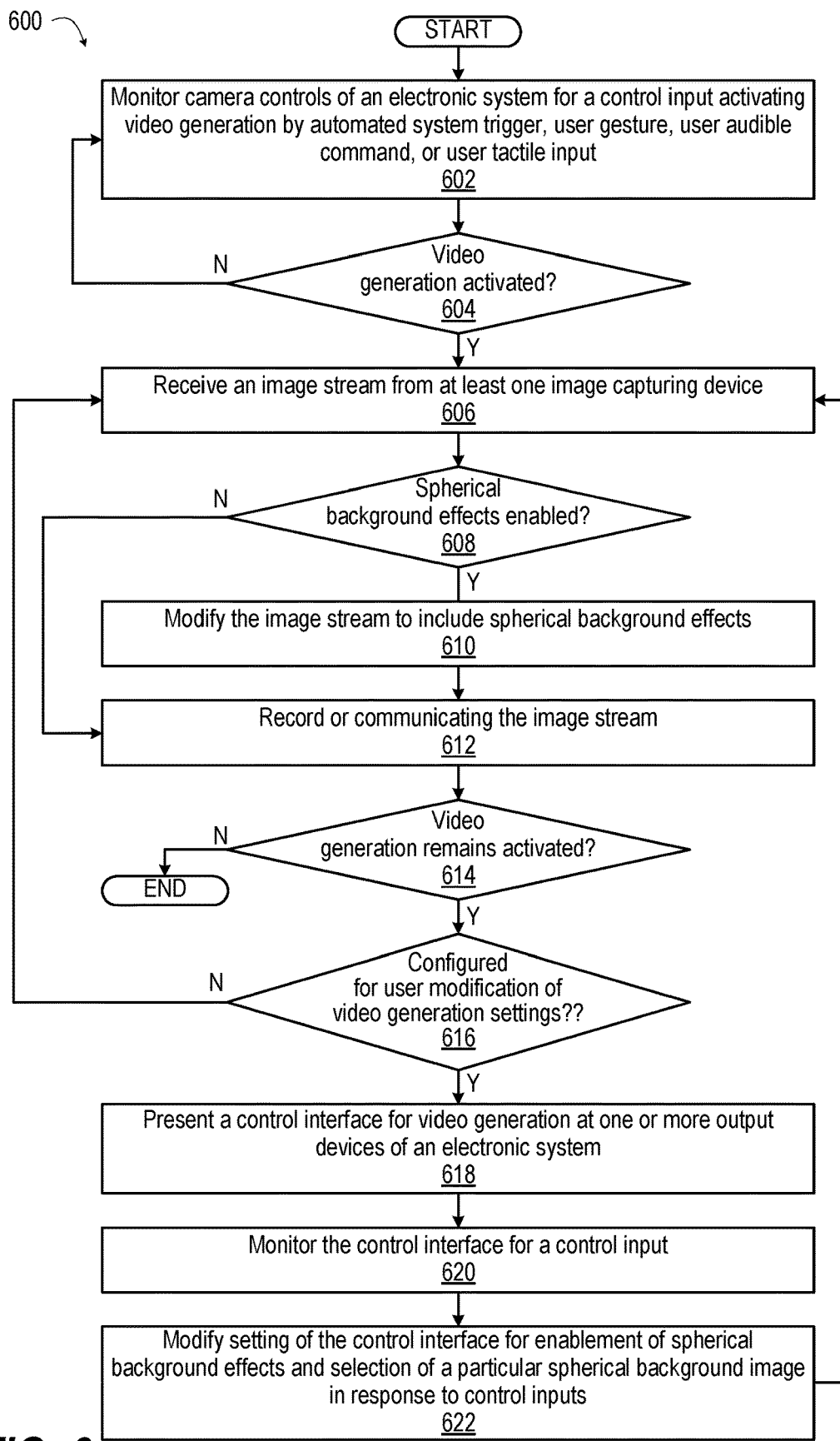
FIG. 6 is a flow diagram presenting a method of controlling a mode of video generation to include or not include spherical background effects, according to one or more embodiments.
Figure 7A:
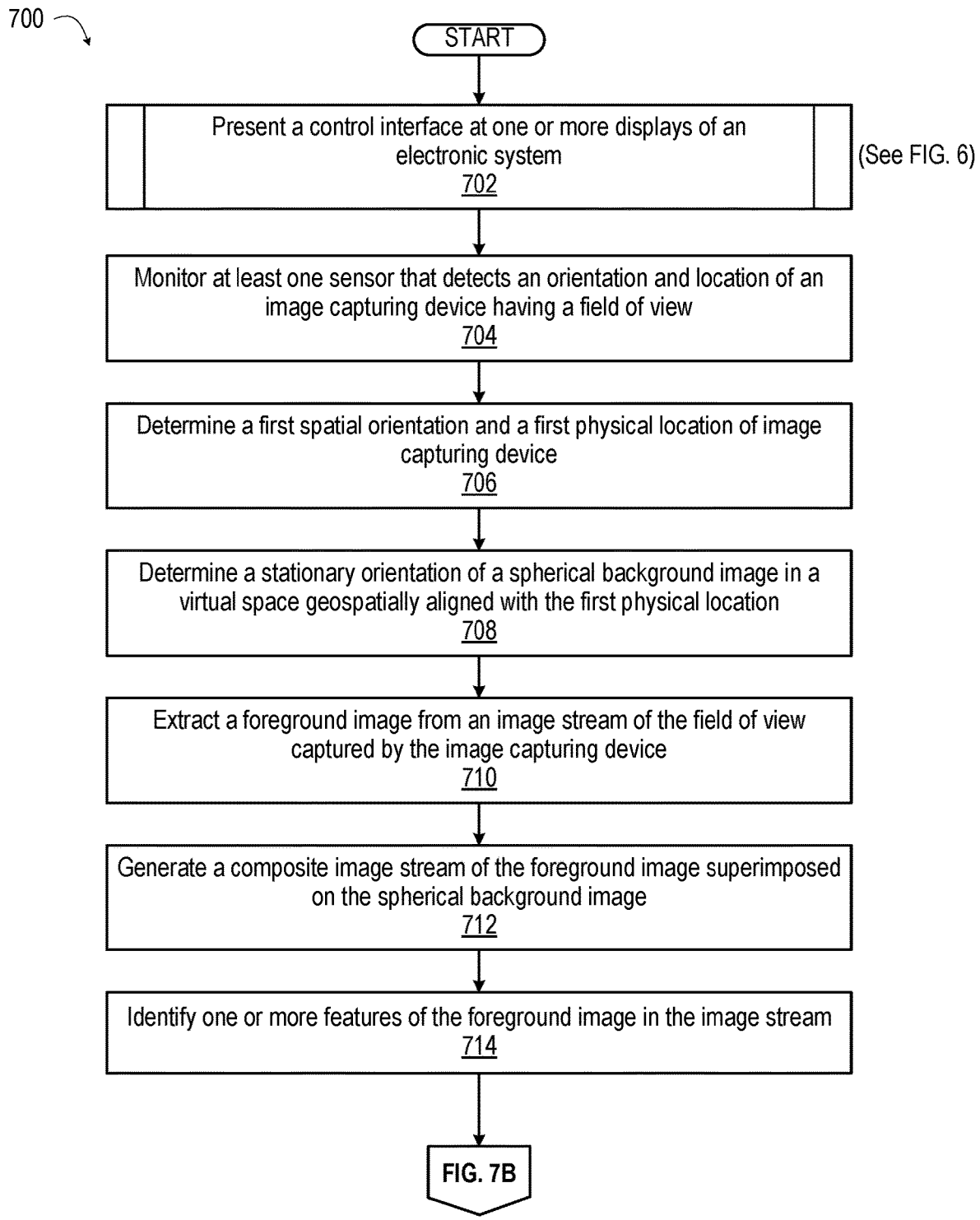
FIGS. 7A-7B (collectively "FIG. 7") present a flow diagram of a method of generating a video with a spherical background image that maintains orientation like a natural background as an image capturing device changes location or aim direction, according to one or more embodiments.
Figure 7B:
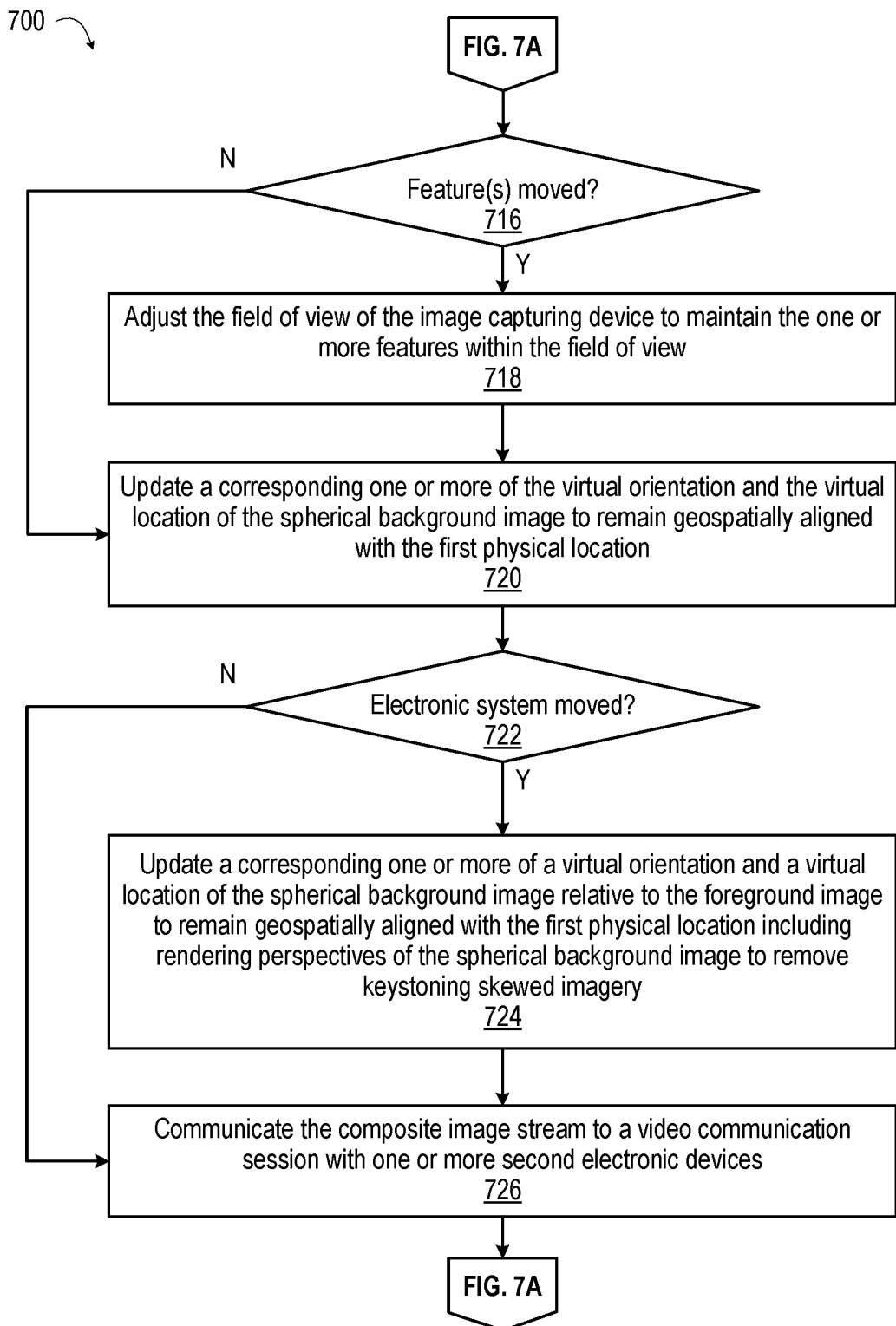

FIG. 6 is a flow diagram presenting a method of controlling a mode of video generation to include or not include spherical background effects. FIGS. 7A-7B (collectively "FIG. 7") is a flow diagram presenting a method of generating a video with a spherical background image that maintains orientation like a natural background as an image capturing device changes location or aim direction. The descriptions of method 600 (FIG. 6) and method 700 (FIGS. 7A-7B) are provided with general reference to the specific components illustrated within the preceding FIGS. 1-5. Specific components referenced in method 600 (FIG. 6) and method 700 (FIGS. 7A-7B) may be identical or similar to components of the same name used in describing preceding FIGS. 1-5. In one or more embodiments, controller 120 (FIGS. 1-3) respectively of electronic system 101 (FIG. 1), communication device 204 (FIG. 2) and remote electronic system 106 (FIG. 3) provides functionality of method 600 (FIG. 6) and method 700 (FIGS. 7A-7B).

With reference to FIG. 6, method 600 includes monitoring camera controls of an electronic system for a control input activating video generation by automated system trigger, user gesture, user audible command, or user tactile input (block 602). Method 600 includes determining whether video generation is activated (decision block 604) in response to determining that video generation is not activated, method 600 returns to block 602. In response to determining that video generation is activated, method 600 includes receiving an image stream from at least one image capturing device (block 606). Method 600 includes determining whether spherical background effects are enabled (decision block 608). In response to determining that spherical background effects are enabled, method 600 includes modifying the image stream to include spherical background effects (block 610). One or more aspects of implementing spherical background effects are described in more detail below with regard to method 700 (FIGS. 7A-7B). In response to determining that spherical background effects are not enabled in decision block 608 or after block 610, method 600 includes recording or communicating the image stream (block 612).

Method 600 includes determining whether video generation remains activated (decision block 614). In response to determining that video generation does not remain activated, method 600 ends. In response to determining that video generation remains activated, method 600 includes determining whether a selection for user modification of video generation settings is received (decision block 616). In response to determining that user modification of video generation settings is selected, method 600 includes presenting a control interface for video generation at one or more output devices of the electronic system (block 618). The control interface provides an opportunity for command inputs to change current settings for spherical background effects. Method 600 includes monitoring the control interface for at least one control input associated with spherical background effects (block 620). Method 600 includes modifying the current setting of the control interface for one or more of enabling spherical background effects and selection of a particular spherical background image in response to the received control inputs (block 622). Then method returns to block 606.

With reference to FIG. 7A method 700 includes determining that video generation is activated with spherical background effects enabled (block 702). Method 700 includes monitoring at least one sensor that detects an orientation and location of an image capturing device having a field of view (block 704). Method 700 includes determining a first spatial orientation and a first physical location of image capturing device (block 706). Method 700 includes determining a stationary orientation of a spherical background image in a virtual space geospatially aligned with the first physical location (block 708). Method 700 includes extracting a foreground image from an image stream of the field of view captured by the image capturing device (block 710). Method 600 includes generating a composite image stream of the foreground image superimposed on the spherical background image (block 712). Method 700 proceeds to block 714 (FIG. 7B).

With reference to FIG. 7B, in one or more embodiments, method 700 includes identifying one or more features of the foreground image in the image stream (block 714). In one or more embodiments, method 700 includes identifying features such as the head, torso, left hand, right hand, etc., of the foreground image. Method 700 includes determining whether the one or more features have moved (decision block 716). In response to determining that the one or more features have moved, method 700 includes adjusting the field of view of the image capturing device to maintain the one or more features within the field of view (block 718). In one or more embodiments, in response to movement of the one or more features, method 700 includes adjusting the field of view by shifting a cropped portion to maintain the one or more features of the foreground image within the field of view. Concurrently, in response to adjustment of the field of view, method 700 includes updating the corresponding one or more of the virtual orientation and the virtual location of the spherical background image to remain geospatially aligned with the first physical location. In one or more embodiments, method 700 includes adjusting the field of view of the image capturing device by shifting a gimballed lens of the image capturing device to maintain the one or more features of the foreground image in the image stream within the field of view in response to movement of the one or more features. And concurrently, in response to adjustment of the field of view, method 700 includes updating the corresponding one or more of the virtual orientation and the virtual location of the spherical background image to remain geospatially aligned with the first physical location.

Method 700 includes updating a corresponding one or more of the virtual orientation and the virtual location of the spherical background image to remain geospatially aligned with the first physical location (block 720). In response to determining that the one or more features have not moved in decision block 716 or after block 720, method 700 includes determining whether at least a portion of the electronic system that includes an image capturing device has moved to one or more of a second spatial orientation and a second physical location (decision block 722). In response to determining that the at least a portion of the electronic system has moved, method 700 includes, updating a corresponding one or more of a virtual orientation and a virtual location of the spherical background image relative to the foreground image to remain geospatially aligned with the first physical location, including rendering perspectives of the spherical background image to remove keystoning skewed imagery (block 724). In response to determining that no portion of the electronic system has moved in decision block 722 or after block 724, in one or more embodiments, method 700 includes communicating image stream in memory to a video communication session with one or more second electronic devices (block 726). Then method 700 returns to block 704 (FIG. 7A).

In one aspect of the present disclosure, method 700 includes monitoring at least one sensor that detects an orientation and location of an image capturing device having a field of view. Method 700 includes determining a first spatial orientation and a first physical location of image capturing device. Method 700 includes determining a stationary orientation of a spherical background image in a virtual space geospatially aligned with the first physical location. Method 700 includes extracting a foreground image from an image stream of the field of view captured by the image capturing device. Method 700 includes generating a composite image stream of the foreground image superimposed on the spherical background image. In response to movement of at least a portion of an electronic system including the image capturing device to one or more of a second spatial orientation and a second physical location, method 700 includes updating a corresponding one or more of a virtual orientation and a virtual location of the spherical background image relative to the foreground image to remain geospatially aligned with the first physical location.

In one or more embodiments, method 700 includes identifying one or more features of the foreground image in the image stream. Method 700 includes adjusting the field of view of the image capturing device to maintain the one or more features within the field of view. Method 700 includes updating a corresponding one or more of the virtual orientation and the virtual location of the spherical background image to remain geospatially aligned with the first physical location in response to adjustment of the field of view.

In one or more particular embodiments, in response to movement of the one or more features, method 700 includes adjusting the field of view by shifting a cropped portion to maintain the one or more features of the foreground image within the field of view. Concurrently, in response to adjustment of the field of view, updating the corresponding one or more of the virtual orientation and the virtual location of the spherical background image to remain geospatially aligned with the first physical location.

In one or more embodiments, adjusting the field of view of the image capturing device includes shifting a gimballed lens of the image capturing device to maintain the one or more features of the foreground image in the image stream within the field of view in response to movement of the one or more features. And, in response to adjustment of the field of view, method 700 includes updating the corresponding one or more of the virtual orientation and the virtual location of the spherical background image to remain geospatially aligned with the first physical location.

In one or more embodiments, updating the corresponding one or more of the virtual orientation and the virtual location of the spherical background image to remain geospatially aligned with the first physical location includes rendering perspectives of the spherical background image to remove keystoning skewed imagery. In one or more embodiments, method 700 includes storing the composite image stream in memory, where the composite image stream is available for later access or communication.

In one or more embodiments, method 700 includes: (i) presenting a control/settings interface at one or more displays; and (ii) generating the composite image stream of the foreground image superimposed on the spherical background image in response to receiving an enabling input via the control/settings interface. In one or more particular embodiments, method 700 includes generating the composite image stream of the foreground image superimposed on a second spherical background image in response to receiving a selection input via the control interface.

Figure 8:
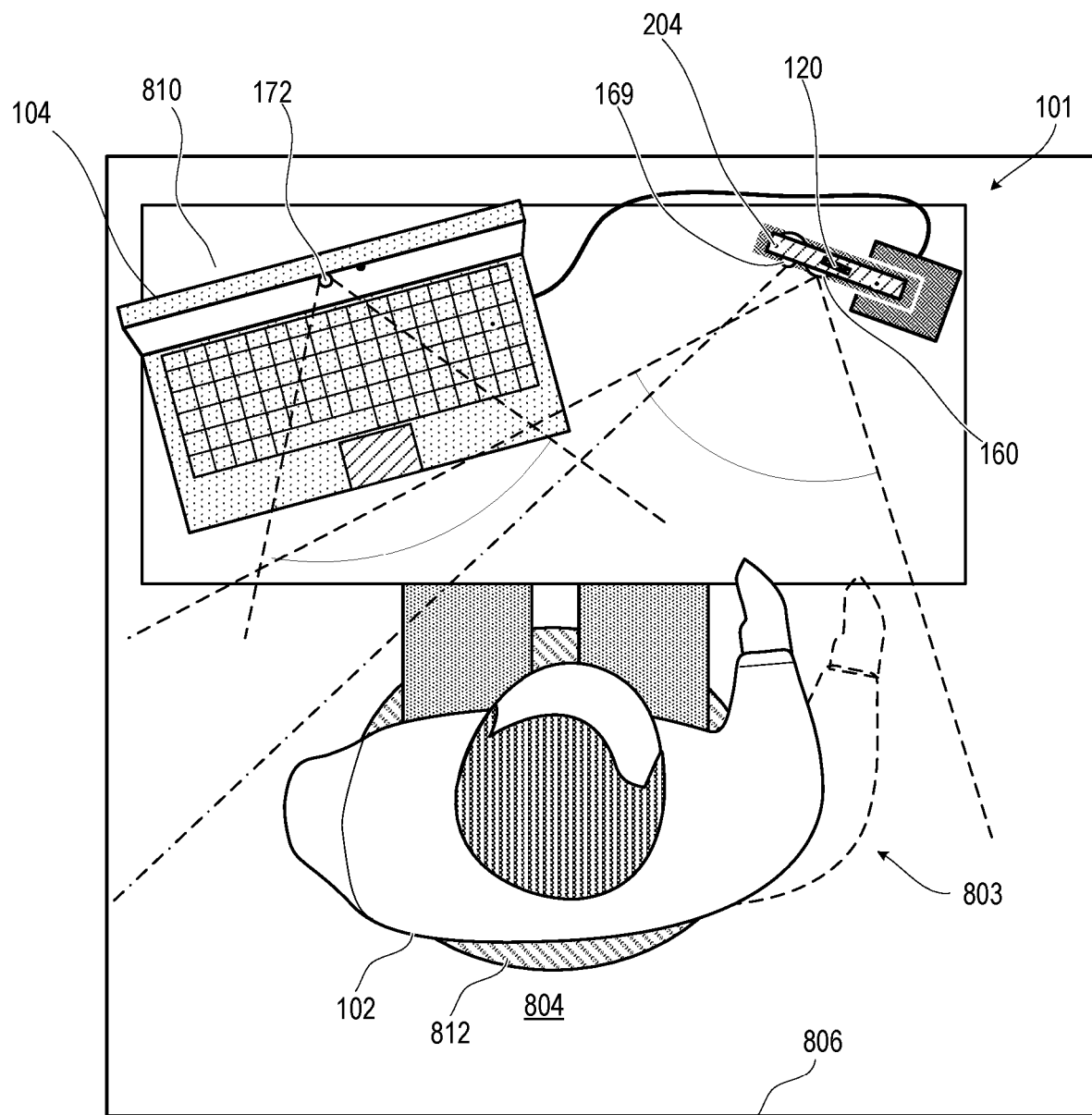
FIG. 8 depicts a top view of an example electronic system generating video with spherical background effects with automatic gesture-controlled background repositioning, according to one or more embodiments.

FIG. 8 depicts a top view of example electronic system 101 generating video with spherical background effects with automatic gesture-controlled background repositioning. Electronic system 101 triggers spherical background effects for video generation in response to detecting a spatially constrained user, such as person 102. In an example, electronic system 101 includes communication device 204 that provides a high-performance ICD 160 and includes electronic device 104 that provides a lower performance ICD 172 and display 802. In one or more embodiments, electronic system 101 detects look gaze direction of person 102, automatically selecting one of ICDs 160 and 172 that person 102 looks toward for at least a threshold period of time. Spherical background effects are triggered based on which ICD 160 and 172 is being used to generate an image stream. Control of spherical background effects are also triggered and controlled by identifying person 102 as being previously defined as a spatially constrained person or currently spatially constrained by physical obstacles. When a person is not spatially constrained, the spherical background effect provides an illusion of a geospatially stationary natural background as the person moves. For a person that is spatially constrained, electronic system 101 automatically makes available similar capabilities for spherical background effects. In an example, person 102 may indicate another portion of the spherical background image to rotate to by gesture rather than by moving to a different location. In an example, person 102 may gesture to rotate horizontally toward a particular lateral side by a horizontal arm waving gesture 803. Although not preserving the illusion of a stationary background, a spherical background effect may allow person 102 to narrate about particular aspects of the spherical background image such as giving a virtual tour.

Examples of a spatially constrained person can include a person confined to a wheelchair or a person having a physical impairment that prevents normal physical movement. An example of person 102 spatially constrained by physical obstacles include person 102 surrounded by physically constrained space 804 defined by walls 806. In one or more embodiments, processor is able to analyze images provided by one of ICDs 160 and 172 to determine the distance to surrounding walls 806. In an example, person 102 is standing or seated within a cubicle of modular walls intended for a single desk 810 and chair 812. In one or more embodiments, different vantage points of ICDs 160 and 172 may be used to determine distance to walls 806. In one or more embodiments, distance is determined based at least in part on distance sensor 169.

As described above in FIG. 1, electronic system 101 includes ICD 160 and/or 172 having a field of view that captures a foreground image with a background image. Electronic system 101 includes network interface 124 and device memory 130 stores at least one spherical background image 150. In one or more embodiments, at least one sensor 164 detects an orientation and location of ICD 160 and/or 172. Controller 120 is communicatively coupled to ICD 160 and/or 172, network interface 124, device memory 130, and sensors 164. Controller 120 determines a first spatial orientation and a first physical location of electronic system 101. Controller 120 determines a stationary orientation of the spherical background image in a virtual space geospatially aligned with the first physical location. Controller 120 extracts the foreground image from an image stream of the field of view captured by ICD 160 and/or 172. Controller 120 generates a composite image stream of the foreground image superimposed on the spherical background image. In response to movement of at least a portion (e.g., ICD 160 and/or 172) of electronic system 101 to one or more of a second spatial orientation and a second physical location, controller 120 updates a corresponding one or more of a virtual orientation and a virtual location of spherical background image relative 150 to the foreground image to remain geospatially aligned with the first physical location.

With continued reference to FIG. 8, electronic system 101 identifies, within the image stream, that the foreground image is in a physically constrained space 804 defined by at least one physical constraint around at least a portion of a background of the foreground image. To identify that the foreground image, corresponding to person 102, is in a physically constrained space, controller 120 may determine a distance to at the least one physical constraint (e.g., walls 806) around at least the portion of the background of the foreground image. Controller 120 then compares the distance to a threshold distance utilized in determining whether to activate gesture-controlled background repositioning (GCBR) feature 236. In response to identifying that the foreground image is in a physically constrained space 804, controller 120 activates GCBR feature 236 to automatically rotate the spherical background image 150 (FIG. 1) based on receipt of a gesture control input.

Alternatively, or in addition, controller 120 identifies person 102 within the field of view of the image stream. Controller 120 determines whether the identified person has an indication of a physical constraint (e.g., sitting in a wheelchair) and/or is relatively stationary. In response to the indication, controller 120 activates GCBR feature 236 to automatically rotate spherical background image 150 (FIG. 1) based on receipt of the gesture control input. Alternatively, or in addition, controller 120 identifies a particular person within the field of view of the image stream as being pre-defined as being movement challenged, including being one or more of relatively stationary or substantially immobile. Controller 120 may identify the particular person using one or more unique identifiers such as: (i) voice recognition; (ii) facial recognition; (iii) a radio frequency identification (RFID) device; and (iv) a user login. In response to identifying the particular person as being pre-defined as stationary, controller 120 activates GCBR feature 236 to automatically rotate spherical background image 150 (FIG. 1) based on receipt of the gesture control input.

To receive the gesture control input, controller 120 identifies an object within the foreground image that moves within physically constrained space 804 to produce a gesture such as one or more: a looking gaze direction; (ii) a mouth movement; (iii) a hand point gesture; and (iv) a head tilting movement. Electronic system 101 may generate video with gesture-controlled background spherical effects. The video can be stored in memory for later access and/or communication. In one or more embodiments, the gestures are pre-defined. Person 102 learns how to make gestures that produce spherical background effects. In one or more embodiments, controller 120 may be placed in a gesture training mode wherein person 102 is prompted to demonstrate a gesture for a particular spherical background effect, such as rotate to the right. The gesture is recorded for comparing to later gestures when returned to an operational mode for spherical background effects. In one or more embodiments, settings for gesture recognition may include adjustments for people who tend to gesture when talking when not intending to control spherical background effects. The settings may enable people who do not tend to "talk with their hands" to make gesture recognition capture very subtle movements to control spherical back effects without a visually distracting gesture to a user who subsequently views the generated video. Electronic system 101 may generate video with gesture-controlled background spherical effects for communication to one or more second electronic devices that participate in the video communication session.

Figure 9A:
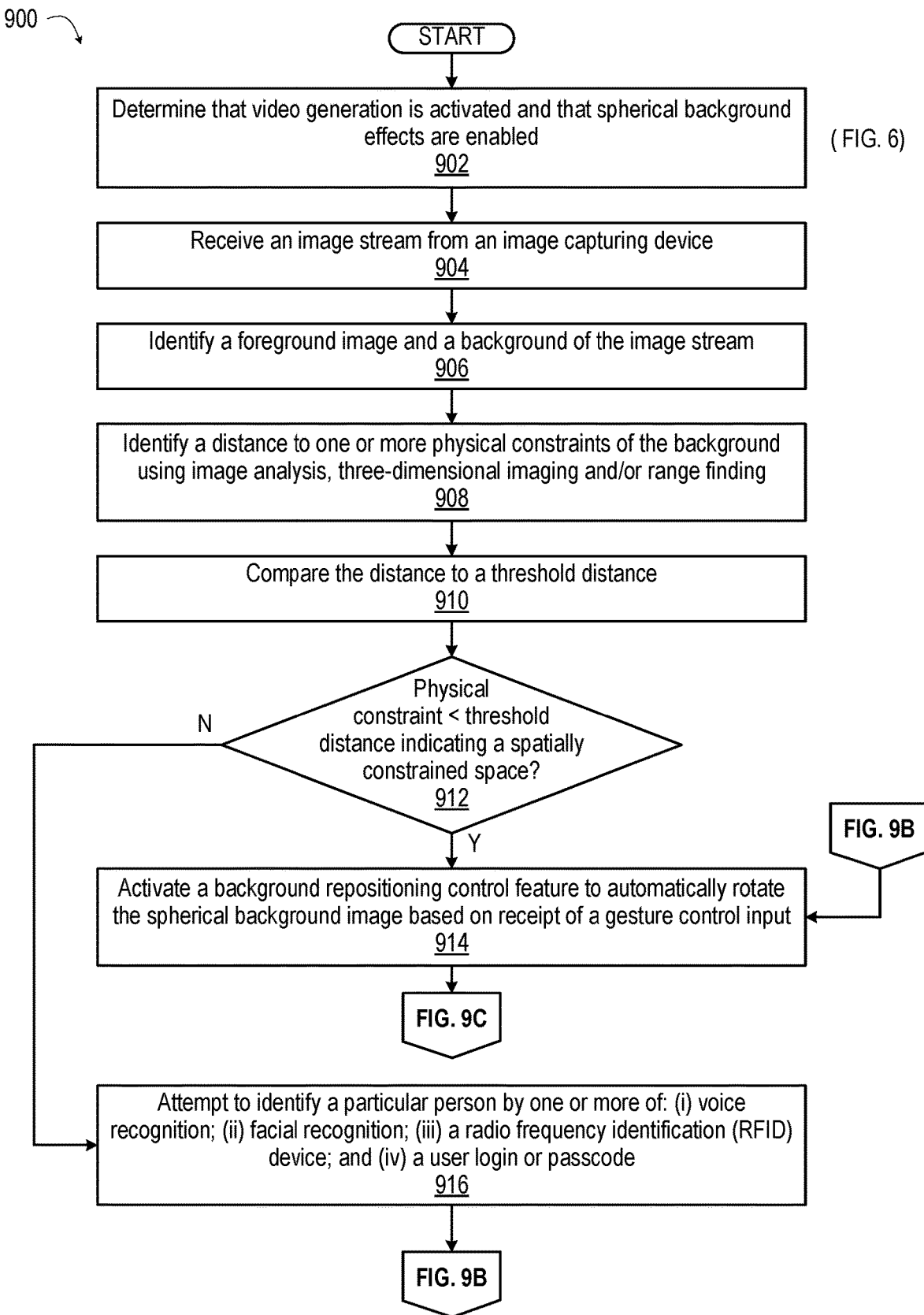
Figure 9B:
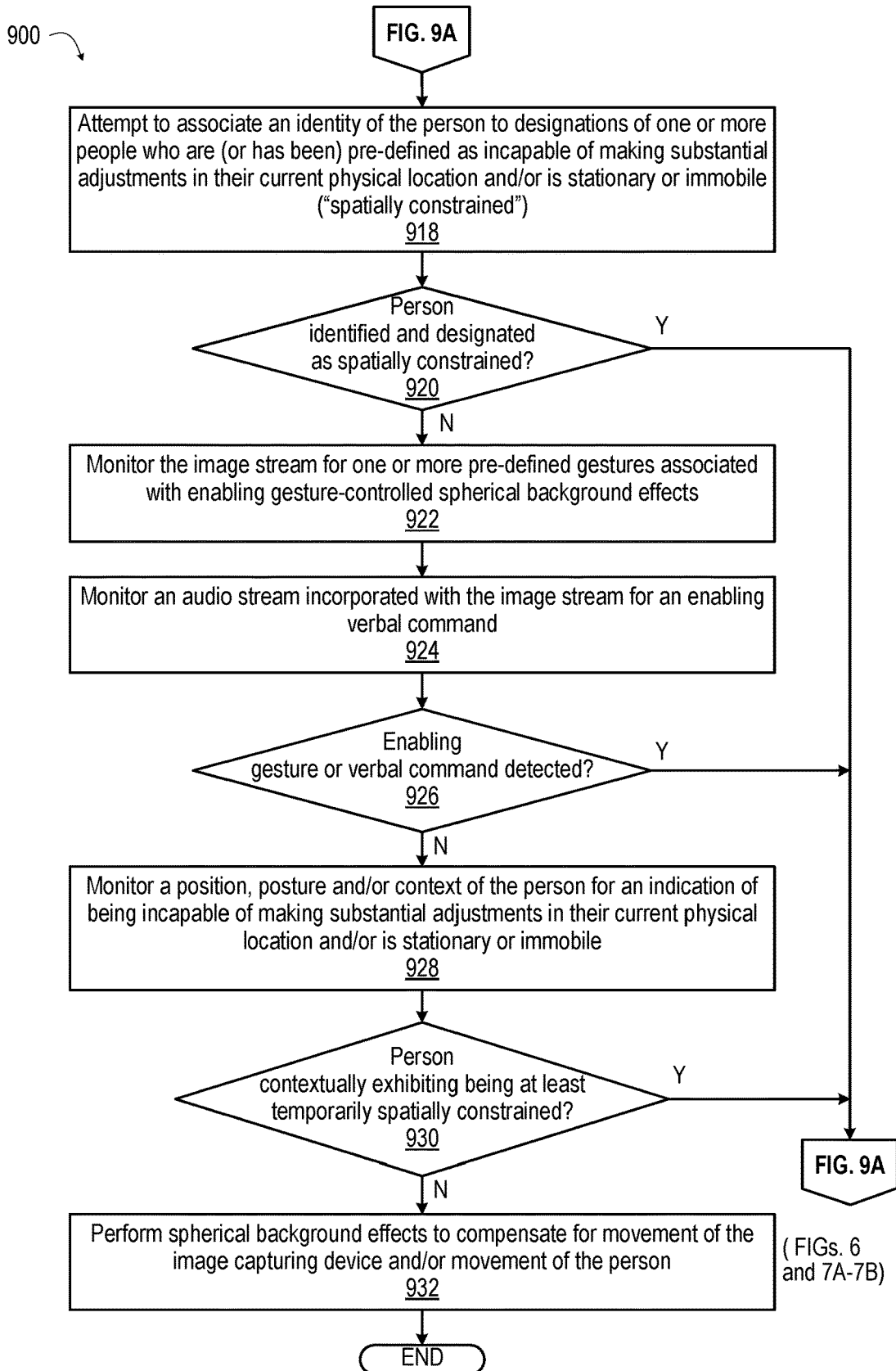

FIGS. 9A-9C (collectively "FIG. 9") present a flow diagram of a method of generating a video recording or stream with spherical background effects and automatic gesture-control background positioning for video generation for a spatially constrained user. The descriptions of method 900 (FIGS. 9A-9C) are provided with general reference to the specific components illustrated within the preceding FIGS. 1-5 and 8. Specific components referenced in method 900 (FIGS. 9A-9B) may be identical or similar to components of the same name used in describing preceding FIGS. 1-5 and 8. In one or more embodiments, controller 120 (FIGS. 1-3) respectively of electronic system 101 (FIGS. 1 and 8), communication device 204 (FIG. 2), and remote electronic system 106 (FIG. 3) provides functionality of method 900 (FIGS. 9A-9B).

With reference to FIG. 9A, as an initial state, method 900 includes determining that video generation is activated and that spherical background effects are enabled (block 902). In an example, an implementation for determining this control state is provided above with regard to FIG. 6. Method 900 provides additional functionality for automatically detecting a spatially constrained user, using one or more techniques to enable gesture-controlled spherical background effects.

With continued reference to FIG. 9A, method 900 includes receiving an image stream from an image capturing device (block 904). Method 900 includes identifying a foreground image and a background of the image stream (block 906). Method 900 includes identifying a distance to one or more physical constraints of the background using image analysis, three-dimensional imaging and/or range finding (block 908). Method 900 includes comparing the distance to a threshold distance (block 910). Method 900 includes determining whether the distance to the physical constraint is less than the threshold distance indicating a spatially constrained space (block 912). In response to determining that the distance to the physical constraint is less than the threshold distance, method 900 includes activating a background repositioning control feature to automatically rotate the spherical background image based on receipt of a gesture control input (block 914). Method 900 then proceeds to block 934 (FIG. 9C)

Alternatively, or in addition to detecting a spatially constrained space, method 900 may include determining whether the person is pre-defined as being spatially constrained. An example is provided with continued reference to FIG. 9A. In response to determining that the distance to the physical constraint is not less than the threshold distance (i.e., equal to or greater than) in decision block 912, method 900 includes attempting to identify a particular person by one or more of: (i) voice recognition; (ii) facial recognition; (iii) a radio frequency identification (RFID) device; and (iv) a user login or passcode (block 916). Then method 900 proceeds to block 920 (FIG. 9B).

With reference to FIG. 9B, method 900 includes attempting to associate an identity of the person to designations of one or more people who are (or has been) pre-defined as incapable of making substantial adjustments in their current physical location and/or is stationary or immobile ("spatially constrained") (block 918). Method 900 includes determining whether the person is identified and designated as spatially constrained (decision block 920). In response to determining that the person is identified and designated as being spatially constrained, method 900 returns to block 914 (FIG. 9A).

Alternatively, or in addition to one or more of detecting a spatially constrained space or a designation of being spatially constrained, method 900 may include determining whether the person performs an enabling gesture. In an example, in response to determining that the person is not identified and designated as being spatially constrained in decision block 920, method 900 includes monitoring the image stream for one or more pre-defined gestures associated with enabling gesture-controlled spherical background effects (block 922). In one or more embodiments, method 900 may include monitoring an audio stream incorporated with the image stream for an enabling verbal command (block 924). In an example, the enabling gesture or enabling verbal command are sufficiently unusual as to not likely to be used without an intent to be enable gesture-controlled spherical background effects. Method 900 includes determining whether either an enabling gesture or an enabling verbal command is detected (decision block 926). In response to determining that either the enabling gesture or the enabling verbal command are detected, method 900 returns to block 914 (FIG. 9A).

Alternatively, or in addition to one or more of detecting a spatially constrained space, a designation of being spatially constrained, and monitoring for an enabling gesture or verbal command, method 900 may include determining whether the person is contextually exhibiting being at least temporarily spatially constrained. In an example, in response to determining that the person has not performed the pre-defined gesture in decision block 926, method 900 includes monitoring a position, posture and/or context of the person for an indication of being incapable of making substantial adjustments in their current physical location and/or is stationary or immobile (block 928). In an example, the method 900 may include recognizing that the person is seated in a low chair that is pull up close to table such the person cannot leave the location quickly. Preparatory steps to pushing back the chair and standing enable a change in the determination and can trigger disabling gesture control spherical background effects. In another example, method 900 may include recognizing a type of chair, couch or bed being used by the person is indicative of being spatially constrained. Method 900 includes determining whether the person is contextually exhibiting being at least temporarily spatially constrained (decision block 930). In response to determining that the person is contextually exhibiting being at least temporarily spatially constrained, method 900 returns to block 914 (FIG. 9A).

In response to not determining that the person is contextually exhibiting being at least temporarily spatially constrained (i.e., none of the conditions indicating being spatially constrained have been satisfied), method 900 includes performing spherical background effects to compensate for movement of the image capturing device and/or movement of the person (block 932). In an example, spherical background effects are performed as described above for method 600 (FIG. 6) and method 700 (FIGS. 7A-7B). Then method 900 ends.

With reference to FIG. 9C, after block 914 (FIG. 9A), method 900 includes determining a first spatial orientation and a first physical location of an image capturing device of an electronic system (block 934). Method 900 includes determining a stationary orientation of a spherical background image in a virtual space geospatially aligned with the first physical location (block 936). Method 900 includes extracting a foreground image of an image stream from a field of view captured by the image capturing device (block 938). Method 900 includes generating a composite image stream of the foreground image superimposed on the spherical background image (block 940). Method 900 includes identifying, by the gesture-controlled background repositioning feature, an object within the foreground image that moves within the physically constrained space to produce a gesture control input comprising one or more of: a looking gaze direction; (ii) a mouth movement; (iii) a hand point gesture; and (iv) a head tilting movement (block 942). Other types of gestures may also be supported. Method 900 includes activating the gesture-controlled background repositioning feature to automatically rotate the spherical background image based on receipt of the gesture control input (block 944). In one or more embodiments, method 900 includes storing the composite image stream in memory for later access and/or communication (block 946). Then method 900 ends.

In one aspect of the present disclosure, method 900 includes determining a first spatial orientation and a first physical location of an image capturing device of an electronic system having a field of view. Method 900 includes determining a stationary orientation of a spherical background image in a virtual space geospatially aligned with the first physical location. Method 900 includes extracting a foreground image from an image stream of the field of view captured by the image capturing device. Method 900 includes generating a composite image stream of the foreground image superimposed on the spherical background image. Method 900 includes identifying, within the image stream, that the foreground image is in a physically constrained space defined by at least one physical constraint around at least a portion of a background of the foreground image. In response to identifying that the foreground image is in a physically constrained space, method 900 includes activating a gesture-controlled background repositioning feature of the electronic system to automatically rotate the spherical background image based on receipt of a gesture control input.

In one or more embodiments, method 900 includes monitoring at least one sensor of the electronic system that detects an orientation and location of the image capturing device. In response to movement of at least a portion of the electronic system to one or more of a second spatial orientation and a second physical location, method 900 includes updating a corresponding one or more of a virtual orientation and a virtual location of the spherical background image relative to the foreground image to remain geospatially aligned with the first physical location.

In one or more embodiments, identifying that the foreground image is in a physically constrained space includes: (i) determining a distance to the at least one physical constraint around at least the portion of the background of the foreground image; and (ii) comparing the distance to a threshold distance utilized in determining whether to activate the background repositioning control feature.

In one or more embodiments, method 900 includes identifying, by the gesture-controlled background repositioning feature, an object within the foreground image that moves within the physically constrained space to produce a gesture control input. A non-comprehensive list of possible gesture control input includes comprising one or more: a looking gaze direction; (ii) a mouth movement; (iii) a hand point gesture; and (iv) a head tilting movement.

In one or more embodiments, in response to determining that the physical constraint is not within a threshold distance to the electronic system, method 900 further includes attempting to identify a particular person by one or more of: (i) voice recognition; (ii) facial recognition; (iii) a radio frequency identification (RFID) device; and (iv) a user passcode. In response to identifying the particular person within the field of view of the image stream as being pre-defined as stationary, method 900 includes activating the gesture-controlled background repositioning feature to automatically rotate the spherical background image based on receipt of a gesture control input.

In one or more embodiments, method 900 includes identifying a person within the field of view of the image stream. Method 900 includes determining whether the identified person has an indication of a physical constraint and/or is relatively immobile/stationary. In response to the indication, method 900 includes activating the gesture-controlled background repositioning feature to automatically rotate the spherical background image based on receipt of the gesture control input.

In one or more embodiments, method 900 includes storing the composite image stream in memory for later access or communication. Alternatively, or in addition, method 900 includes communicating the composite image stream via a communications subsystem of the electronic system and a network to one or more second electronic devices that participate in a video communication session.

Figure 10:
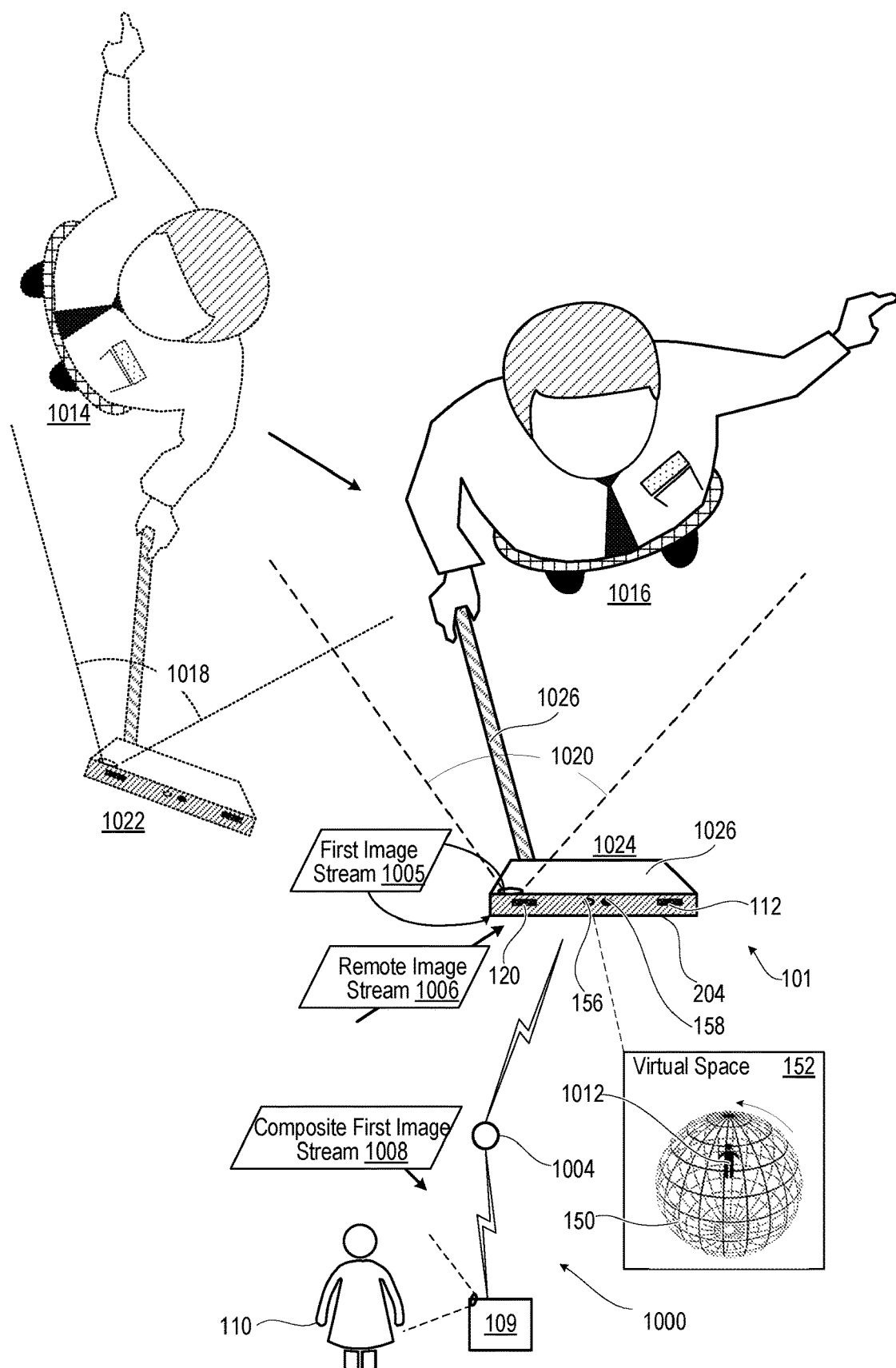
FIG. 10 presents a diagram of a communication environment that supports a video call having spherical background effects, according to one or more embodiments.

FIG. 10 presents a diagram of communication environment 1000 that provides a video call between electronic devices, with video images that include spherical background effects. Person 102 interacts with output devices 156 and input devices 158 supported by communication device 204 to participate in a video call with second person 110 using second electronic device 109. For clarity, electronic system 101 and second electronic device 109 are depicted as connected by communication node 1004, which represents any combination of wired or wireless communication networks, such as described herein. Controller communicates, via communications node 1004, with second electronic device 109. In an example, controller receives remote image stream 1006 from second electronic device 109 and transmits composite first image stream 1008 of person 102 to second electronic device 109. Controller manages virtual space 152 to provide an illusion that spherical background image 150 remains geospatially stationary when generating composite first-image stream 1008. In an example, controller 120 generates a spherical background effect as foreground image 1012 of person 102 moves from location 1014 to location 1016 and is viewed from a different vantage point by ICD 160 rotating FOV 1018 to FOV 1020 while moving from location 1022 to location 1024. Controller presents images on output device 156 for person 102.

In one aspect of the present disclosure, electronic system 101 includes communications subsystem 112 that enables electronic system 101 to connect over a network, such as network node 1004, to a video communication session with one or more second electronic devices 109. In one or more embodiments, communications subsystem 112 includes network interface 124 (FIG. 1) that enables electronic system 101 to communicatively connect to network node 1004. In one or more embodiments, communications subsystem 112 includes radio frequency (RF) transceiver 266 (FIG. 2) that is communicatively connectable to a radio access network that is in turn connected to network node 1004.

Electronic system 101 includes at least one ICD 172 that has a field of view that encompasses a foreground and a background. Controller 120 is communicatively connected to communications subsystem 112 and the at least one ICD 172. Controller 120 determines a first spatial orientation and a first physical location of electronic system 101. Controller 120 determines a stationary orientation of a spherical background image in a virtual space geospatially aligned with the first physical location. Controller 120 extracts foreground image 1012 from first image stream 1005 captured from FOV 1018 of ICD 172. Controller generates composite first image stream 1008 of foreground image 1012 superimposed on spherical background image 150. Controller 120 communicates composite first image stream 1008 to one or more second electronic devices 109 that participate in a video communication session.

In one or more embodiments, in response to movement of at least a portion of electronic system 101 including ICD 172 to one or more of a second spatial orientation and a second physical location, controller 120 updates a corresponding one or more of a virtual orientation and a virtual location of spherical background image 150 to remain geospatially aligned with the first physical location. In one or more embodiments, controller 120 receives, via communications subsystem 112 (FIGS. 1-2) and the network such as network node 1004, video call content including one or more of image content and audio content originating from at least one second electronic device 109. Controller 120 presents the video call content at one or more output devices 156. Controller 120 presents at least one of: (i) a mirror image of a locally captured video feed (i.e., first image stream 1005) from the field of view; and (ii) the mirror image of the locally captured video feed from the field of view with a real background image replaced with spherical background image 150.

In one or more embodiments, controller 120 identifies one or more features of foreground image 1012 in first image stream 1005. Controller 120 adjusts the field of view of ICD 172 to maintain the one or more features within the field of view. In response to an adjustment of the field of view, controller 120 updates a corresponding one or more of the virtual orientation and the virtual location of spherical background image 150 relative to foreground image 1012 to remain geospatially aligned with the first physical location.

In one or more embodiments, one or more output devices 156 includes one or more display devices 1026. Controller 120 receives video call content including image content (e.g., remote image stream 1006) from at least one second electronic device 109. Controller 120 assigns each image content from a corresponding one of at least one second electronic device 109 to a respective virtual assigned location in spherical background image 150. Controller presents the image content superimposed on spherical background image 150 presented at one or more display devices 1026.

In one or more particular embodiments, in response to receiving a movement input from a particular one of at least one second electronic device 109 indicating a change in one or more of orientation and location of received image content from second electronic device 109, controller 120 reassigns the received image content corresponding to the particular one of at least one second electronic device 109 to a respective virtual assigned location in spherical background image 150. Controller 120 creates a second field of view of the composite image stream from a vantage point of having the change of the received foreground image in one or more of the orientation and location of the particular one of at least one second electronic devices 109. Controller 120 determines a stationary orientation of spherical background image 150 in virtual space 152 geospatially aligned with the first physical location from a vantage point of the second field of view. Controller extracts foreground image 1012 extracted from first image stream 1005 of the field of view from image capturing device 172. Controller 120 generates a composite image stream of foreground image 1012 superimposed on spherical background image 150. Controller 120 communicates the second field of view of the composite image stream to particular one or more second electronic devices 109.

Figure 11A:
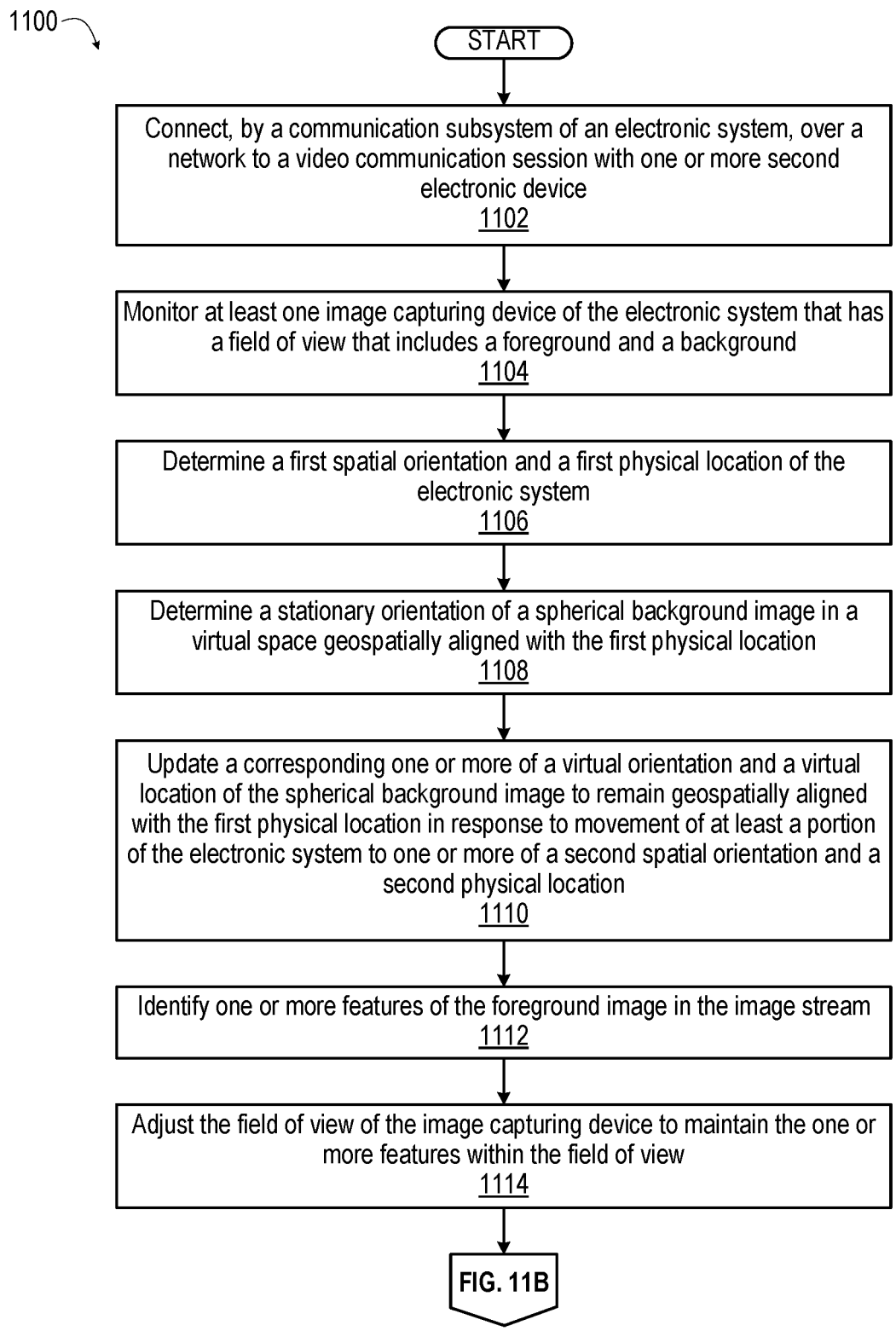
FIGS. 11A-11B (collectively "FIG. 11") present a flow diagram of a method of generating a host video with spherical background effects for a video call between electronic devices, according to one or more embodiments.
Figure 11B:
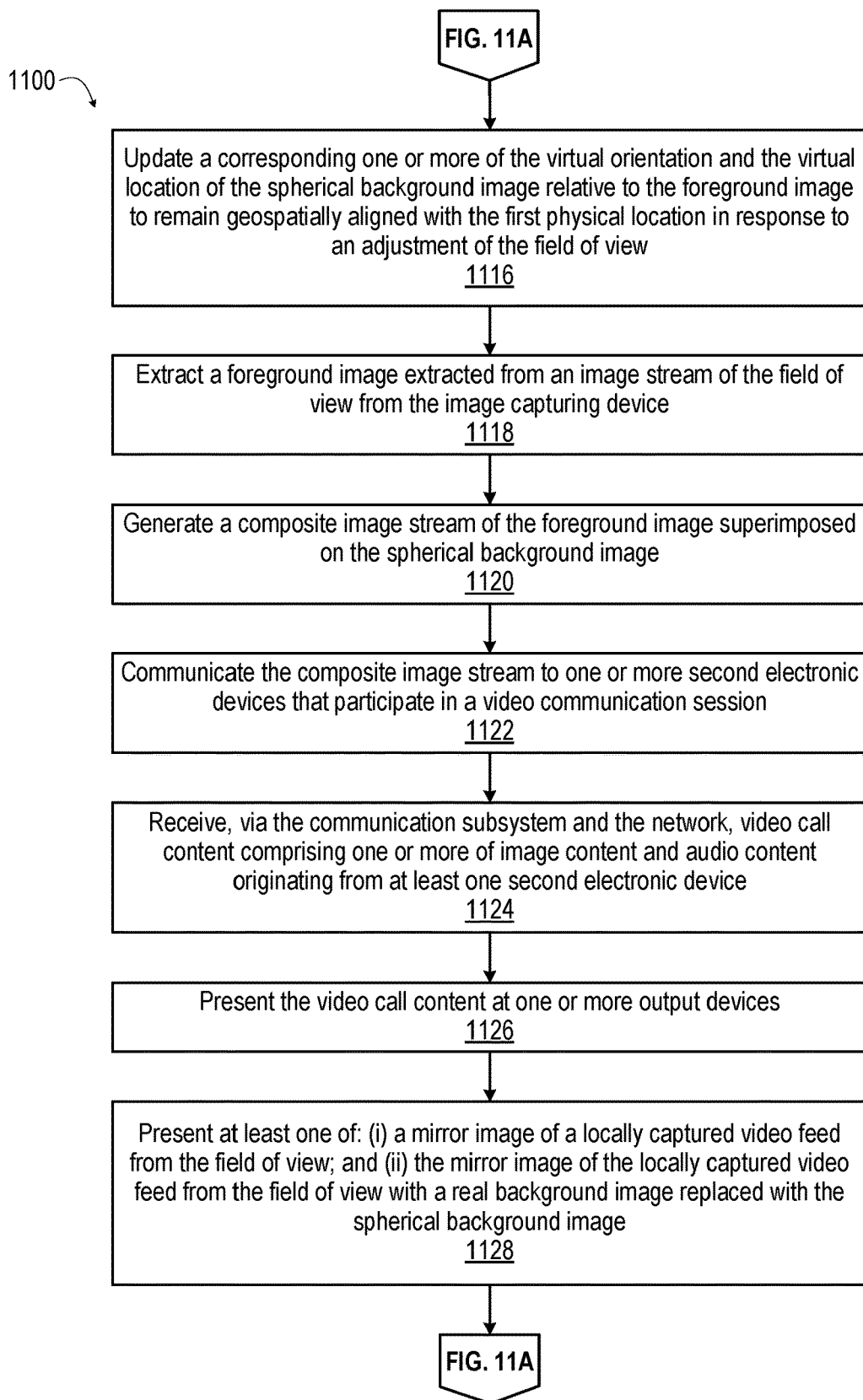

FIGS. 11A-11B (collectively "FIG. 11") present a flow diagram of a method of generating a host video with a spherical background effects for a video call between electronic devices. The description of method 1100 (FIGS. 11A-11B) is provided with general reference to the specific components illustrated within the preceding FIGS. 1-5 and 8. Specific components referenced in method 1100 (FIGS. 11A-11B) may be identical or similar to components of the same name used in describing preceding FIGS. 1-5 and 8. In one or more embodiments, controller 120 (FIGS. 1-3) respectively of electronic system 101 (FIGS. 1 and 8), communication device 204 (FIG. 2), and remote electronic system 106 (FIG. 3) provides functionality of method 1100 (FIGS. 11A-11B).

With reference to FIG. 11A, method 1100 includes connecting over a network, by a communications subsystem of an electronic system, to a video communication session with one or more second electronic device (block 1102). In one or more embodiments, the communications subsystem is a network interface that enables the electronic system to communicatively connect to the network. In one or more embodiments, the communications subsystem is a radio frequency (RF) transceiver communicatively connectable to a radio access network that is connected to the network. Method 1100 includes monitoring an image stream captured within a field of view of at least one image capturing device of the electronic system, the image stream including a foreground and a background (block 1104). Method 1100 includes determining a first spatial orientation and a first physical location of the electronic system (block 1106). Method 1100 includes determining a stationary orientation of a spherical background image in a virtual space geospatially aligned with the first physical location (block 1108). In one or more embodiments, method 1100 includes updating a corresponding one or more of a virtual orientation and a virtual location of the spherical background image to remain geospatially aligned with the first physical location in response to movement of at least a portion of the electronic system including the image capturing device to one or more of a second spatial orientation and a second physical location (block 1110). In one or more embodiments, method 1100 includes identifying one or more features of the foreground image in the image stream (block 1112). Method 1100 includes adjusting the field of view of the image capturing device to maintain the one or more features within the field of view (block 1114). Then, method 1100 proceeds to FIG. 11B.

With reference to FIG. 11B, method 1100 includes updating a corresponding one or more of the virtual orientation and the virtual location of the spherical background image relative to the foreground image to remain geospatially aligned with the first physical location in response to an adjustment of the field of view (block 1116). Method 1100 includes extracting a foreground image from an image stream of the field of view from the image capturing device (block 1118). Method 1100 includes generating a composite image stream of the foreground image superimposed on the spherical background image (block 1120). Method 1100 includes communicating the composite image stream to one or more second electronic devices that participate in a video communication session (block 1122). Method 1100 includes receiving, via the communications subsystem and the network, video call content comprising one or more of image content and audio content originating from at least one second electronic device (block 1124). Method 1100 includes presenting the video call content at one or more output devices (block 1126). Method 1100 includes presenting at least one of: (i) a mirror image of a locally captured video feed from the field of view; and (ii) the mirror image of the locally captured video feed from the field of view with a real background image replaced with the spherical background image (block 1128). Then method 1100 returns to block 1104 (FIG. 11A).

FIG. 12 presents a diagram of communication environment 1200 between electronic system 101 and second electronic devices 109a, 109b, and 109c used respectively by first person 102, second person 110a, second person 110b, and second person 110c. Communication environment 1200 supports a video call that includes shared multiple person virtual venue 1203 with spherical background effects presented at respective user interface device 154 by corresponding electronic system 101 and second electronic devices 109a, 109b, and 109c Electronic system 101 enables a shared virtual environment for the video call using video stitching with a rotatable spherical background incorporated into multiple person virtual venue 1203. For clarity, electronic system 101 and second electronic devices 109a-109c are depicted as connected by communication node 1204, which represents any combination of wired or wireless communication networks such as described herein.

In an example, person 102 is a host of a game or academic lecture and is standing before natural background objects 1202 as viewed by ICD 160. In one embodiment, person 110a remains stationary while second device 109a moves from vantage point 1205 to vantage point 1206. In another embodiment, person 110b moves from physical location 1207 to physical location 1208 while second electronic device 109b remains stationary. In yet another embodiment, person 110c and second electronic device 109c remain stationary although person 110c moves a feature such as right arm 1212. As one implementation feature of the disclosure, person 102 selects virtual venue controls such as "enable virtual venue" control 1214 and "select virtual venue" control 1216 to trigger or activate the virtual venue features and functions described herein.

In one aspect of the present disclosure, electronic system 101 includes communications subsystem 112 that enables electronic system 101 to connect over a network such as via communication node 1204 to a video communication session with at least first electronic device 104 and second electronic devices 109a-109c used respectively by persons 110a-110c, as multiple participants in a video communication session. Controller 120 is communicatively connected to communications subsystem 112. Controller 120 determines a stationary orientation of spherical background image 150 used to provide virtual venue 1203 for the video communication session. Controller 120 receives a first image stream from first electronic device 104 and second image streams from second electronic devices 109a-109c. Controller 120 extracts first foreground image 1220 from the first image stream and extracts second foreground images 1222a, 1222b, and 1222c respectively from the second image streams. Controller 120 generates composite image stream 1224 of first foreground image 1220 superimposed at first assigned location 1226 on spherical background image 150 and second foreground images 1222a-1222c superimposed respectively at second assigned locations 1228, 1230, and 1232 on spherical background image 150. Foreground image 1222b moves from initial second assigned location 1230 to new assigned location 1230a. Person 110b appears to virtually move within virtual venue 1203 as person 102 is also allowed to move.

Controller 120 communicates at least a first portion of composite image stream 1224 to first electronic device 104. The first portion of composite image stream is oriented to a first vantage point associated with first assigned location 1226 of virtual venue 1203 presented within spherical background image 150. In an example, virtual venue 1203 may arrange the participants in a circle, an elongated boardroom arrangement, a lecture arrangement, a rectangular array, etc. Controller 120 communicates at least a second portion of composite image stream 1224 to second electronic devices 109a-109c. The second portion is oriented to a second vantage point associated with second assigned locations 1228, 1230, and 1232 within virtual venue 1203 presented within spherical background image 150. Controller 120 rotates spherical background image 150 relative to first and second vantage points (1226, 1228, 1230, and 1232) presented to a respective display device, such as user interface device 154 of first electronic device 104 and second electronic devices 109a-109c, in relation to movement of a corresponding one of first participant (102) and/or second participants (110a-110c).

User interface device 154 may present first image stream 1240 as generated by ICD 160. To assist person 102 in moving within natural background objects 1202 while looking at user interface device 154, controller 120 may present first mirrored image stream 1242. To assist person 102 in seeming to interact with virtual background objects in spherical background image 150, controller 120 presents first mirrored composite image stream 1244, which includes image of person physically located in a same virtual space as virtual background objects.

In one or more embodiments, controller 120 communicates a first mirror image of at least the first portion of composite image stream 1224 to second electronic device 109a-109c, the first mirror image presented along with the second portion on a second display device of second electronic device 109a-109c to present virtual venue 1203 with participants (102 and 110a-110c) at different vantage points within a same spherical background image (150). Controller 120 communicates a second mirror image of at least the second portion of the composite image stream to first electronic device 104. The second mirror image is presented along with the first portion on a first display device of first electronic device 104 to present virtual venue 1203 with participants (102 and 110a-110c) at different vantage points within a same spherical background image (150).

In one or more embodiments, first electronic device 104 may position more than one visual quiz answer 1261, 1262, and 1263 within virtual reach by a second foreground image (1222c) proximate to second assigned location (1232). Electronic device 104 detects a selection gesture, such as raising arm 1212 by second foreground image (1222c) aligned with a particular one of the more than one visual quiz answer. Electronic device 104 associates an output response to selection of the particular one of the more than one visual quiz answer (1261). Electronic device 104 presents output response 1265 at one or more at least first electronic device 104 and second electronic devices 109a-109c in the video communication session.

Figure 13A:
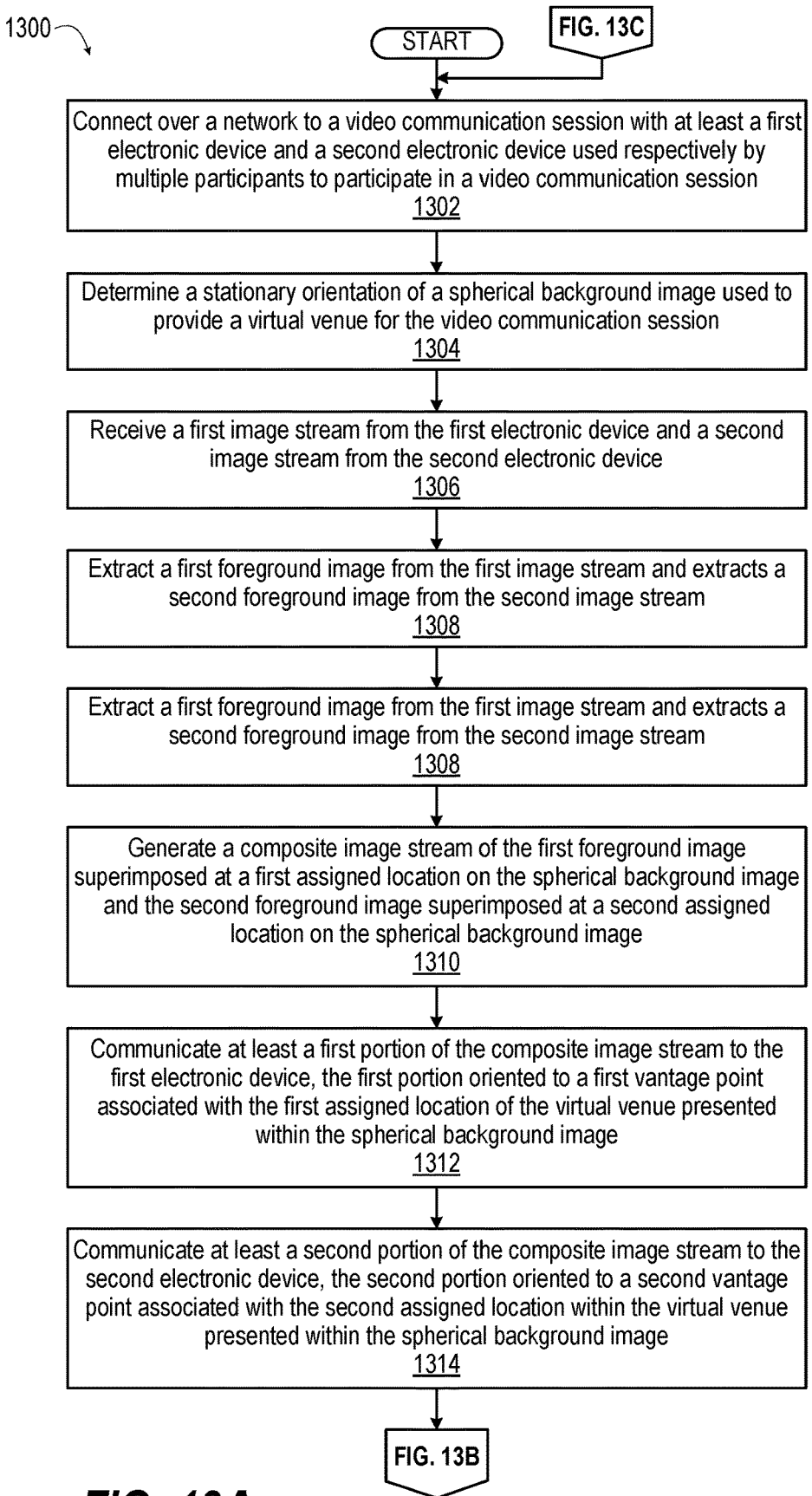
FIGS. 13A-13C (collectively "FIG. 13") present a flow diagram of a method of generating a video stream with spherical background effects for multiple participants presented in a shared virtual venue during a video call, according to one or more embodiments.
Figure 13B:
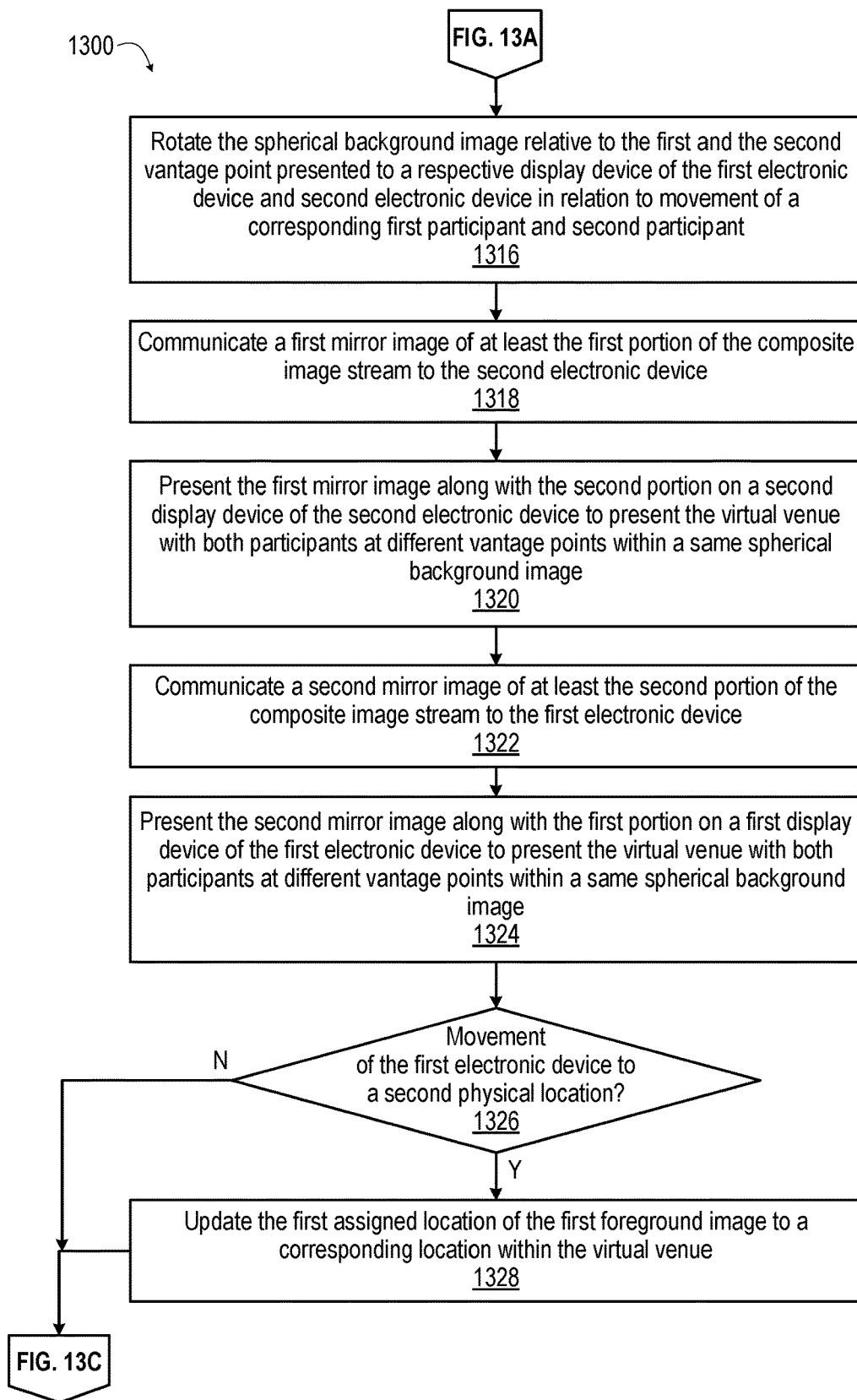
Figure 13C:
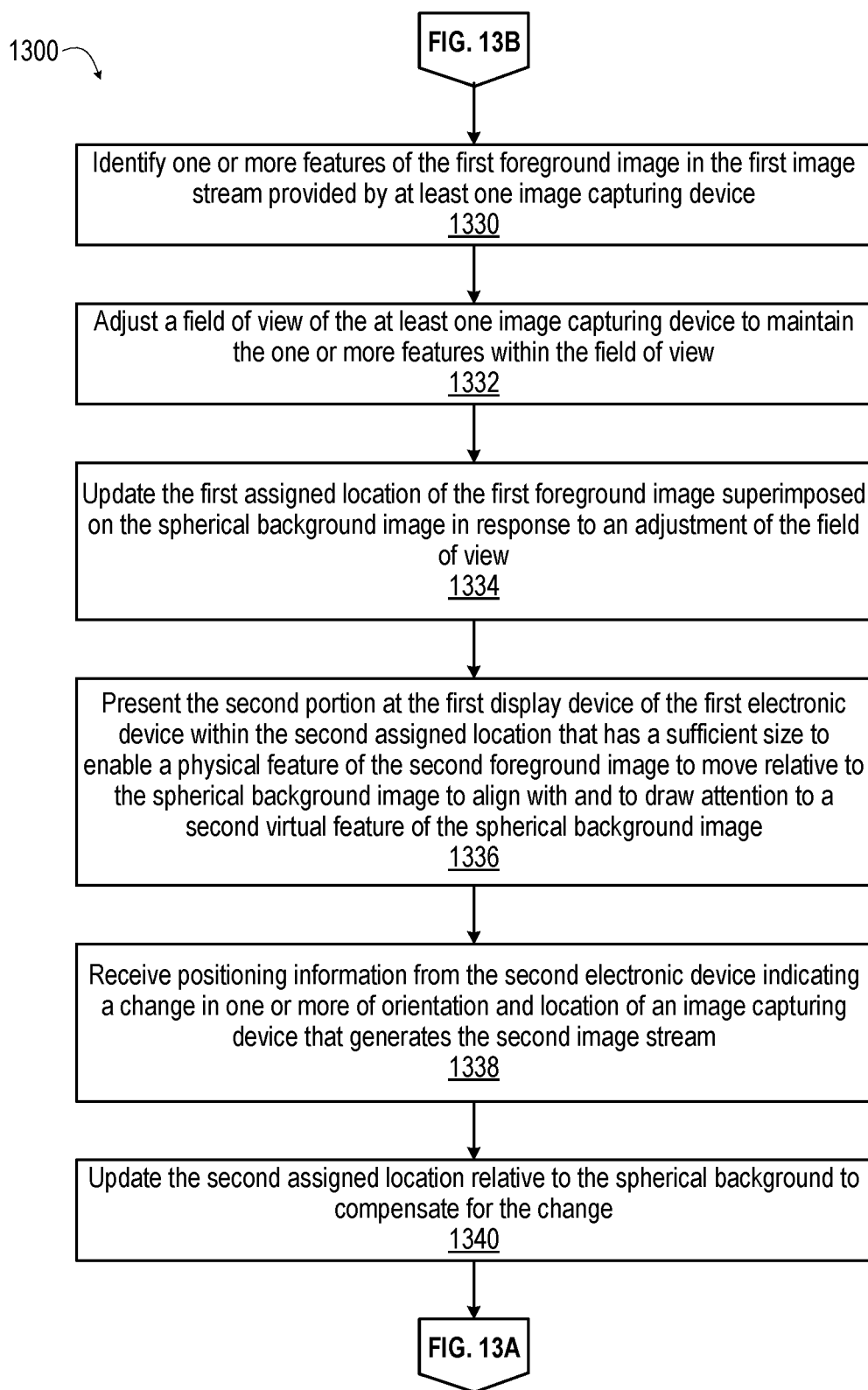
Figure 14:
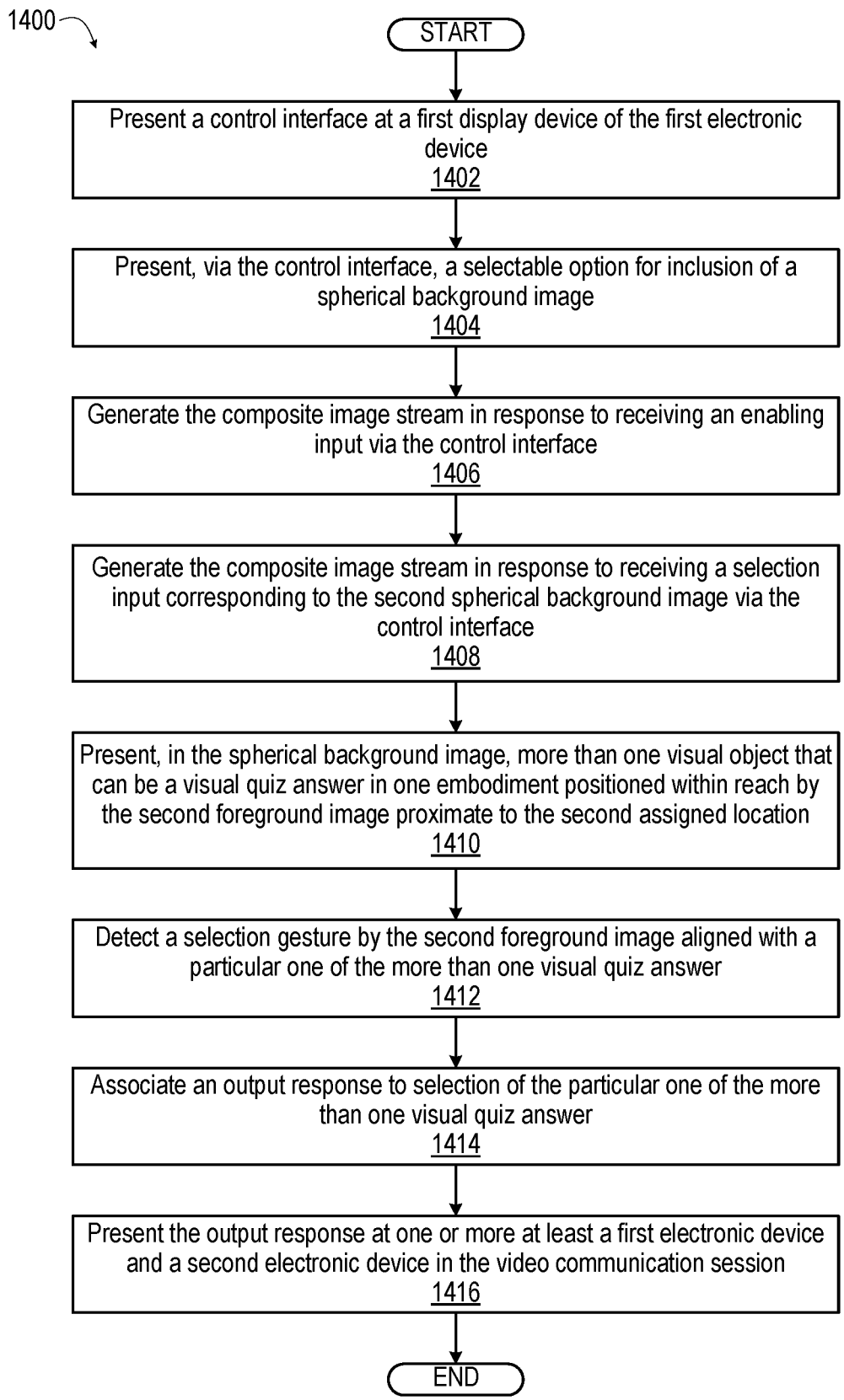
FIG. 14 presents a flow diagram of a method of incorporating visual quiz interactions with the shared virtual venue, according to one or more embodiments.

FIGS. 13A-13C (collectively "FIG. 13") present a flow diagram of a method of generating a video image stream with spherical background effects for multiple participants presented in a shared virtual venue during a video call. FIG. 14 presents a flow diagram of a method of incorporating visual quiz interactions within the shared virtual venue. The descriptions of method 1300 (FIGS. 13A-13C) and method 1400 (FIG. 14) are provided with general reference to the specific components illustrated within the preceding FIGS. 1-5 and 12. Specific components referenced in method 1300 (FIGS. 13A-13C) and method 1400 (FIG. 14) may be identical or similar to components of the same name used in describing preceding FIGS. 1-5 and 12. In one or more embodiments, controller 120 (FIGS. 1-3) respectively of electronic system 101 (FIGS. 1 and 12), communication device 204 (FIG. 2), and remote electronic system 106 (FIG. 3) provides functionality of method 1300 (FIGS. 13A-13C) and method 1400 (FIG. 14).

With reference to FIG. 13A, method 1300 includes connecting over a network to a video communication session with at least a first electronic device and a second electronic device used respectively by multiple participants to participate in the video communication session (block 1302). Method 1300 includes determining a stationary orientation of a spherical background image used to provide a virtual venue for the video communication session (block 1304). Method 1300 includes receiving a first image stream from the first electronic device and a second image stream from the second electronic device (block 1306). Method 100 includes extracting a first foreground image from the first image stream and extracting a second foreground image from the second image stream (block 1308). Method 1300 includes generating a composite image stream of the first foreground image superimposed at a first assigned location on the spherical background image and the second foreground image superimposed at a second assigned location on the spherical background image (block 1310). Method 1300 includes communicating at least a first portion of the composite image stream to the first electronic device, the first portion oriented to a first vantage point associated with the first assigned location of the virtual venue presented within the spherical background image (block 1312). Method 1300 includes communicating at least a second portion of the composite image stream to the second electronic device, the second portion oriented to a second vantage point associated with the second assigned location within the virtual venue presented within the spherical background image (block 1314). Then method 1300 proceeds to block 1316 of FIG. 13B.

With reference to FIG. 13B, method 1300 includes rotating the spherical background image relative to the first and the second vantage point presented to a respective display device of the first electronic device and second electronic device in relation to movement of a corresponding first participant and second participant (block 1316). In one or more embodiments, method 1300 includes communicating a first mirror image of at least the first portion of the composite image stream to the second electronic device (block 1318). Method 1300 includes presenting the first mirror image along with the second portion on a second display device of the second electronic device to present the virtual venue with both participants at different vantage points within a same spherical background image (block 1320). Method 1300 includes communicating a second mirror image of at least the second portion of the composite image stream to the first electronic device (block 1322). Method 1300 includes presenting the second mirror image along with the first portion on a first display device of the first electronic device to present the virtual venue with both participants at different vantage points within a same spherical background image (block 1324). Then method 1300 proceeds to block 1326 of FIG. 13C.

With reference to FIG. 13C, method 1300 includes determining whether a movement has occurred of at least a portion of the first electronic device including the image capturing device to a second physical location (decision block 1326). In response to determining that the movement has occurred of at least the portion of the first electronic device, method 1300 includes updating the first assigned location of the first foreground image to a corresponding location within the virtual venue (block 1328). Method 1300 includes identifying one or more features of the first foreground image in the first image stream provided by at least one image capturing device (block 1330). In response to determining that the movement has not occurred of at least the portion of the first electronic device or after block 1328, method 1300 includes identifying one or more features of the first foreground image in the first image stream provided by at least one image capturing device (block 1330). Method 1300 includes adjusting a field of view of the at least one image capturing device to maintain the one or more features within the field of view (block 1332). Method 1300 includes updating the first assigned location of the first foreground image superimposed on the spherical background image in response to an adjustment of the field of view (block 1334). In one or more embodiments, method 1300 includes presenting the second portion of the composite image stream at the first display device of the first electronic device. The second assigned location has a sufficient size to enable a physical feature of the second foreground image to move relative to the spherical background image to align with and draw attention to a second virtual feature of the spherical background image (block 1336). In one or more embodiments, method 1300 includes receiving positioning information from the second electronic device indicating a change in one or more of orientation and location of an image capturing device that generates the second image stream (block 1338). Method 1300 includes updating the second assigned location relative to the spherical background to compensate for the change (block 1340). Then method 1300 returns to block 1302 (FIG. 13A).

With reference to FIG. 14, method 1400 includes presenting a control interface at a first display device of the first electronic device (block 1402). Method 1400 includes presenting, via the control interface, a selectable option for inclusion of a spherical background image (block 1404). Method 1400 includes generating the composite image stream in response to receiving an enabling input via the control interface (block 1406). In one or more embodiments, method 1400 includes generating the composite image stream in response to receiving a selection input corresponding to the second spherical background image via the control interface (block 1408). In one or more particular embodiments, method 1400 includes presenting, in the spherical background image, more than one visual object that can be a visual quiz answer in one embodiment positioned within reach by the second foreground image proximate to the second assigned location (block 1410). Method 1400 includes detecting a selection gesture by the second foreground image aligned with a particular one of the more than one visual quiz answer (block 1412). Method 1400 includes associating an output response to selection of the particular one of the more than one visual quiz answer (block 1414). Method 1400 includes presenting the output response at one or more at least a first electronic device and a second electronic device in the video communication session (block 1416). Then method 1400 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation is not limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic system comprising:
    a communication subsystem that enables the electronic system to connect over a network to a video communication session with one or more second electronic device;
    one or more output devices;
    at least one image capturing device (ICD) that has a field of view (FOV) that includes a foreground and a background;
    a controller communicatively connected to the communication subsystem and the at least one image capturing device, and which:
        determines a first spatial orientation and a first physical location of the electronic system;
        receives a selection of a spherical background image and determines a stationary orientation of the spherical background image in a virtual space geospatially aligned with the first physical location;
        extracts a foreground image extracted from an image stream of the field of view from the at least one image capturing device;
        generates a composite image stream of the foreground image superimposed on the spherical background image;
        generates and presents a spherical background effect as the foreground image moves from a first location to a second location and is viewed from a different vantage point by the at least one ICD rotating the FOV while the at least one ICD moves from a first ICD location to a second ICD location, to provide an illusion that the spherical background image remains geospatially stationary within the composite image stream; and
        communicates the composite image stream to one or more second electronic systems that participate in a video communication session.

2. The electronic system of claim 1, wherein, in response to movement of at least a portion of the electronic system to one or more of a second spatial orientation and a second physical location, the controller updates a corresponding one or more of a virtual orientation and a virtual location of the spherical background image to remain geospatially aligned with the first physical location.

3. The electronic system of claim 1, wherein the controller:
    receives, via the communication subsystem and the network, video call content comprising one or more of image content and audio content originating from at least one second electronic device;
    presents the video call content at the one or more output devices; and
    presents at least one of: (i) a mirror image of a locally captured video feed from the field of view; and (ii) the mirror image of the locally captured video feed from the field of view with a real background image replaced with the spherical background image.

4. The electronic system of claim 1, wherein the controller:
    identifies one or more features of the foreground image in the image stream;
    adjusts the field of view of the at least one image capturing device to maintain the one or more features within the field of view; and
    in response to an adjustment of the field of view, updates a corresponding one or more of the virtual orientation and the virtual location of the spherical background image relative to the foreground image to remain geospatially aligned with the first physical location.

5. The electronic system of claim 1, wherein:
    the one or more output devices comprises one or more display devices; and
    the controller:
        receives video call content comprising image content from the at least one second electronic device;
        assigns foreground image extracted from each image content from a corresponding one of the at least one second electronic device to a respective virtual assigned location in the spherical background image; and
        presents the foreground images from each image content superimposed on the spherical background image within one or more display devices.

6. The electronic system of claim 5, wherein, in response to receiving a movement input from a particular one of the at least one second electronic device indicating a change in one or more of orientation and location at the second electronic device, the controller:
    reassigns the image content corresponding to the particular one of the at least one second electronic device to a respective virtual assigned location in the spherical background image; and
    creates a second field of view of the composite image stream from a vantage point of having the change in one or more of the orientation and location of the particular one of the at least one second electronic devices;
    determines stationary orientation of the spherical background image in a virtual space geospatially aligned with the first physical location from a vantage point of the second field of view;
    extracts a foreground image extracted from an image stream of the field of view from the at least one image capturing device;
    generates a composite image stream of the foreground image superimposed on the spherical background image; and
    communicates the second field of view of the composite image stream to the particular one or more second electronic systems.

7. The electronic system of claim 5, wherein, in response to receiving a movement input from a particular one of the at least one second electronic device indicating a change in location of an object within a field of view of a second image capturing device associated with the respective at least one second electronic device, the controller:
reassigns the foreground image extracted from image content corresponding to the particular one of the at least one second electronic device to an updated virtual assigned location in the spherical background image based on the movement input.

8. The electronic device of claim 1, wherein the controller:
enables a virtual venue for conducting the video communication session, the virtual venue comprising the spherical background image and includes the foreground image superimposed thereon;
in response to receiving second image content from the at least one second electronic device:
extracts a second foreground image from each respective second image stream receive; and
generates and presents composite image stream comprising first foreground image superimposed at a first assigned location on spherical background image and second foreground images superimposed, respectively, at second assigned locations on spherical background image.

9. A method comprising:
connecting, by a communication subsystem of an electronic system, over a network to a video communication session with one or more second electronic device;
monitoring at least one image capturing device of the electronic system that has a field of view that includes a foreground and a background;
determining a first spatial orientation and a first physical location of the electronic system;
receiving a selection of a spherical background image and determining a stationary orientation of the spherical background image in a virtual space geospatially aligned with the first physical location;
extracting a foreground image from an image stream of the field of view from the at least one image capturing device;
generating a composite image stream of the foreground image superimposed on the spherical background image;
generating and presenting a spherical background effect as the foreground image moves from a first location to a second location and is viewed from a different vantage point by the at least one ICD rotating the FOV while the at least one ICD moves from a first ICD location to a second ICD location, to provide an illusion that the spherical background image remains geospatially stationary within the composite image stream; and
communicating the composite image stream to one or more second electronic systems that participate in a video communication session.

10. The method of claim 9, further comprising:
in response to movement of at least a portion of the electronic system to one or more of a second spatial orientation and a second physical location, updating a corresponding one or more of a virtual orientation and a virtual location of the spherical background image to remain geospatially aligned with the first physical location.

11. The method of claim 9, further comprising:
receiving, via the communication subsystem and the network, video call content comprising one or more of image content and audio content originating from at least one second electronic device;
presenting the video call content at one or more output devices; and
presenting at least one of: (i) a mirror image of a locally captured video feed from the field of view; and (ii) the mirror image of the locally captured video feed from the field of view with a real background image replaced with the spherical background image.

12. The method of claim 9, further comprising:
identifying one or more features of the foreground image in the image stream;
adjusting the field of view of the at least one image capturing device to maintain the one or more features within the field of view; and
in response to an adjustment of the field of view, updating a corresponding one or more of the virtual orientation and the virtual location of the spherical background image relative to the foreground image to remain geospatially aligned with the first physical location.

13. The method of claim 9, further comprising:
receiving video call content comprising image content from the at least one second electronic device;
assigning foreground image extracted from each image content from a corresponding one of the at least one second electronic device to a respective virtual assigned location in the spherical background image; and
presenting the foreground image extracted from image content superimposed on the spherical background image within one or more display devices.

14. The method of claim 13, further comprising:
in response to receiving a movement input from a particular one of the at least one second electronic device indicating a change in one or more of orientation and location at the second electronic device:
reassigning the image content corresponding to the particular one of the at least one second electronic device to a respective virtual assigned location in the spherical background image; and
creating a second field of view of the composite image stream from a vantage point of having the change in one or more of the orientation and location of the particular one of the at least one second electronic devices;
determining stationary orientation of the spherical background image in a virtual space geospatially aligned with the first physical location from a vantage point of the second field of view;
extracting a foreground image from an image stream of the field of view from the at least one image capturing device;
generating a composite image stream of the foreground image superimposed on the spherical background image; and
communicating the second field of view of the composite image stream to the particular one of the at least one second electronic device.

15. The method of claim 13, further comprising:
in response to receiving a movement input from a particular one of the at least one second electronic device indicating a change in location of an object within a field of view of a second camera associated with the respective at least one second electronic device:

reassigning the foreground image extracted from the image content corresponding to the particular one of the at least one second electronic device to an updated virtual assigned location in the spherical background image based on the movement input.

16. The method of claim 9, further comprising:
enabling a virtual venue for conducting the video communication session, the virtual venue comprising the spherical background image and includes the foreground image superimposed thereon;
in response to receiving second image content from the at least one second electronic device:
   extracting a second foreground image from each respective second image stream receive; and
   generating and presenting composite image stream comprising first foreground image superimposed at a first assigned location on spherical background image and second foreground images superimposed, respectively, at second assigned locations on spherical background image.

17. A computer program product comprising:
a computer readable storage device; and
program code on the computer readable storage device that when executed by a processor associated with an electronic system, the program code enables the electronic system to provide functionality of:
   connecting, by a communication subsystem of the electronic device, over a network to a video communication session with one or more second electronic device;
   monitoring at least one image capturing device of the electronic system that has a field of view that includes a foreground and a background;
   determining a first spatial orientation and a first physical location of the electronic system;
   receiving a selection of a spherical background image and determining a stationary orientation of the spherical background image in a virtual space geospatially aligned with the first physical location
   extracting a foreground image from an image stream of the field of view from the at least one image capturing device;
   generating a composite image stream of the foreground image superimposed on the spherical background image;
   generating and presenting a spherical background effect as the foreground image moves from a first location to a second location and is viewed from a different vantage point by the at least one ICD rotating the FOV while the at least one ICD moves from a first ICD location to a second ICD location, to provide an illusion that the spherical background image remains geospatially stationary within the composite image stream; and
   communicating the composite image stream to one or more second electronic systems that participate in a video communication session.

18. The computer program product of claim 17, wherein the program code enables the electronic system to provide functionality of, in response to movement of at least a portion of the electronic system to one or more of a second spatial orientation and a second physical location, updating a corresponding one or more of a virtual orientation and a virtual location of the spherical background image to remain geospatially aligned with the first physical location.

19. The computer program product of claim 17, wherein the program code enables the electronic system to provide functionality of
   receiving video call content comprising image content from the at least one second electronic device;
   assigning each image content from a corresponding one of the at least one second electronic device to a respective virtual assigned location in the spherical background image; and
   presenting the image content superimposed on the spherical background image within one or more display devices.

20. The computer program product of claim 17, wherein the program instructions further enables the electronic system to provide functionality of:
   enabling a virtual venue for conducting the video communication session, the virtual venue comprising the spherical background image and includes the foreground image superimposed thereon;
in response to receiving second image content from the at least one second electronic device:
   extracting a second foreground image from each respective second image stream receive; and
   generating and presenting composite image stream comprising first foreground image superimposed at a first assigned location on spherical background image and second foreground images superimposed, respectively, at second assigned locations on spherical background image.

* * * * *